(12) United States Patent
Di et al.

(10) Patent No.: US 7,498,398 B2
(45) Date of Patent: Mar. 3, 2009

(54) THERMOPLASTIC COMPOSITION, METHOD OF MAKING, AND ARTICLES FORMED THEREFROM

(75) Inventors: Jianbo Di, Evansville, IN (US); Brian Mullen, Mt. Vernon, IN (US); Paul Dean Sybert, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 256 days.

(21) Appl. No.: 11/385,171

(22) Filed: Mar. 21, 2006

(65) Prior Publication Data

US 2007/0225470 A1  Sep. 27, 2007

(51) Int. Cl.
C08G 63/00 (2006.01)
C08G 64/00 (2006.01)

(52) U.S. Cl. ............... 528/196; 264/176.1; 264/219; 428/411.1; 428/412; 528/198

(58) Field of Classification Search .............. 264/176.1, 264/219; 428/411.1, 412; 528/196, 198
See application file for complete search history.

(56) References Cited

U.S. PATENT DOCUMENTS

| | | | |
|---|---|---|---|
| 4,319,003 | A | 3/1982 | Gardland |
| 4,628,081 | A | 12/1986 | Mark et al. |
| 4,677,183 | A | 6/1987 | Mark et al. |
| 4,728,716 | A | 3/1988 | Mark et al. |
| 4,751,264 | A | 6/1988 | Mar et al. |
| 4,758,626 | A | 7/1988 | Ishihara et al. |
| 4,871,830 | A | 10/1989 | Mark et al. |
| 6,143,848 | A | 11/2000 | Lee et al. |
| 6,255,422 | B1 | 7/2001 | Bertin et al. |
| 6,255,448 | B1 | 7/2001 | Grimaldi et al. |
| 6,262,179 | B1 | 7/2001 | Nicol |
| RE37,851 | E | 9/2002 | Bertelo et al. |
| 6,495,720 | B1 | 12/2002 | Couturier et al. |
| 6,509,428 | B1 | 1/2003 | Senninger |
| 6,531,556 | B2 | 3/2003 | Minaux et al. |
| 6,538,141 | B1 | 3/2003 | Gillet et al. |
| 6,569,967 | B1 | 5/2003 | Couturier et al. |
| 6,624,322 | B1 | 9/2003 | Gillet et al. |
| 6,646,079 | B2 | 11/2003 | Guerret et al. |
| 6,657,043 | B1 | 12/2003 | Guerret et al. |
| 6,700,007 | B2 | 3/2004 | Couturier et al. |
| 6,706,832 | B2 | 3/2004 | Minaux et al. |
| 6,734,269 | B1 | 5/2004 | Buback et al. |
| 6,762,263 | B2 | 7/2004 | Callais et al. |
| 6,784,256 | B1 | 8/2004 | Lee et al. |
| 6,949,613 | B2 | 9/2005 | Haddleton |

FOREIGN PATENT DOCUMENTS

JP  11106458  * 4/1999

OTHER PUBLICATIONS

International Search Report for International Application No. PCT/US2007/003317, mailed Aug. 7, 2007, 8 pages.

Written Opinion for International Search Report for International Application No. PCT/US2007/003317, mailed Aug. 7, 2007, 8 pages.
Japanese Patent Application No. 1999106458, Published Apr. 20, 1999, Machine Translation, 26 pages.
Lima, V.; Jiang, X.; Brokken-Zijp, J.; Schoenmakers, P. J.; Klumperman, B.; Van Der Linde, R., Synthesis and characterization of telechelic polymethacrylates via RAFT polymerization. Journal of Polymer Science, Part A: Polymer Chemistry 2005, 43, (5), 959-973.
Sarbu, T.; Lin, K.-Y.; Spanswick, J.; Gil, R. R.; Siegwart, D. J.; Matyjaszewski, K., Synthesis of Hydroxy-Telechelic Poly(methyl acrylate) and Polystyrene by Atom Transfer Radical Coupling. Macromolecules 2004, 37, (26), 9694-9700.
Nakagawa, Y., Commercialization of telechelic polyacrylates prepared by ATRP. Abstracts of Papers, 227th ACS National Meeting, Anaheim, CA, United States, Mar. 28-Apr. 1, 2004 2004, PMSE-109.
Bielawski, C. W.; Jethmalani, J. M.; Grubbs, R. H., Synthesis of telechelic polyacrylates with unsaturated end-groups. Polymer 2003, 44, (13), 3721-3726.
Shim, A. K.; Coessens, V.; Pintauer, T.; Gaynor, S.; Matyjaszewski, K., Preparation of macrodiols by atom transfer radical polymerization. Polymer Preprints (American Chemical Society, Division of Polymer Chemistry) 1999, 40, (2), 456-457.
Puts, R. D.; Nicholas, P. P.; Milam, J.; Miller, D.; Elce, E.; Lee, J.; Pourahmady, N., Telechelic acrylic polymers using degenerative iodine transfer polymerization. Polymer Preprints (American Chemical Society, Division of Polymer Chemistry) 1999, 40, (2), 415.
Maus, C.; Fontaine, F.; Van Den Bossche, G.; Sobry, R.; Jerome, R., SAXS analysis of hyperstructure in carboxylato-telechelic poly(tert. butyl acrylate)'s. Journal de Physique IV: Proceedings 1993, 3, (C8, IX International Conference on Small Angle Scattering, 1993), 67-70.
Edelmann, D.; Ritter, H., Synthesis of telechelics with furany end groups. 3. Synthesis of side-chain liquid-crystalline telechelics and network formation with unsaturated polyesters via Diels-Alder additions. Macromolecular Rapid Communications 1994, 15, (10), 791-6.

(Continued)

Primary Examiner—Terressa M Boykin

(57) ABSTRACT

A polyacrylate-polycarbonate copolymer comprises a polycarbonate block comprising aromatic carbonate units, and a polyacrylate block derived from a difunctional polyacrylate polymer having the formula $$Z^1\text{-}(M)_x\text{-}Z^2$$

wherein M is an acrylate block unit comprising a reaction residue of a (meth)acrylate monomer, a non-(meth)acrylate monomer, or a combination comprising a (meth)acrylate and a non-(meth)acrylate monomer, at least one acrylate block unit is a (meth)acrylate monomer; x is greater than one; and $Z^1$ and $Z^2$ are each independently functionalized terminal groups of the formula $$\text{-}(A^3)_y\text{-}B,$$

wherein B is a reactive group comprising a hydroxy or non-hydroxy group, $A^3$ an aliphatic group, an aromatic group, or an aliphatic-aromatic group, y is 0 or 1, $A^3$ is free of hydrogen atoms beta to B when B is a hydroxy group, and B and $A^3$ are each free of sulfur atoms. A method of making, a thermoplastic composition, and articles are also disclosed.

20 Claims, No Drawings

OTHER PUBLICATIONS

Sugizaki, T.; Maruoka, S.; Tsuchida, I.; Saito, T. Acrylic polymer-based pressure-sensitive adhesive compositions. 90-120616, 04018478, 19900510., 1992.

Wang, et al. "Synthesis and Evaluation of New Dicarboxylic Acid Functional Trithiocarbonates: RAFT Synthesis of Telechelic Poly(n-butyl acrylate)s" Macromolecules. American Chemical Society. Aug. 24, 2005. 8 pages.

Lai, et al. "Functional Polymers from Novel Carboxyl-Terminated Trithiocarbonates as Highly Efficient RAFT Agents". Macromolecules 2002, 35, 6754-6756.

* cited by examiner

THERMOPLASTIC COMPOSITION, METHOD OF MAKING, AND ARTICLES FORMED THEREFROM

BACKGROUND OF THE INVENTION

This disclosure relates to thermoplastic compositions, methods of manufacture, and articles and uses thereof.

Polycarbonates and its copolymers, with their balance of properties including transparency, low color, impact resistance, ductility, and melt flow, are useful in applications where both excellent toughness and UV stability is needed. For applications where more stringent toughness properties are desired, including low temperature impact and ductility, thick section impact and ductility, and retention of ductility on heat aging, an unalloyed polycarbonate itself may be insufficient.

Toughness and ductility in polycarbonates may typically be further improved by adding core/shell impact modifiers. However, use of impact modifiers can affect the UV stability of a polycarbonate so modified, which can affect the resistance of a material to color change (i.e., color stability); loss of gloss (i.e., gloss retention), particularly in opaque compositions; loss of transmission/increase in haze for transparent resins; or loss of other physical properties upon exposure to UV light such as from sunlight or artificial light. Impact modifiers based on unsaturated elastomers, such as butadiene, can react photolytically, and therefore have low UV stability, whereas acrylate based impact modifiers generally have a lower photolytic reactivity and greater UV stability. Nonetheless, acrylate core/shell impact modified polycarbonates may suffer from other drawbacks including increased gloss loss on weathering; visual defects affecting part aesthetics including gate blush (a dull or discolored area at the gate injection site of an injection molded article) and flow lines (a mark on a molded plastic article formed at the meeting of two flow fronts) formed during molding; and increased opacity. Impact modifiers are typically intrinsically non-miscible components that can form separate domains that scatter light and provide a white appearance. Thus, in addition to reduced transmission due to the increase opacity, the whiteness of the blend color may increase, which can adversely affect the preparation of colored impact modified polycarbonate compositions where it is desirable to have both the improved impact properties as well as high gloss, and depth and richness of color.

There accordingly remains a need in the art for polycarbonates having good melt stability, improved ductility, and low haze for use in thermoplastic compositions. In addition, the resins should not produce objectionable odors during melt processing. The thermoplastic compositions prepared therefrom also desirably have improved color capability, weatherability, and gloss retention.

SUMMARY OF THE INVENTION

The above deficiencies in the art are alleviated by, in an embodiment, a polyacrylate-polycarbonate copolymer comprising: a polyacrylate-polycarbonate copolymer comprising: a polycarbonate block comprising aromatic carbonate units, and a polyacrylate block derived from a difunctional polyacrylate polymer having the formula $$Z^1\text{-}(M)_x\text{-}Z^2$$

wherein M is an acrylate block unit comprising a reaction residue of a (meth)acrylate monomer, a non-(meth)acrylate monomer, or a combination comprising a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $$\text{-}(A^3)_y\text{-}B,$$

wherein B is a reactive end group comprising a hydroxy group or non-hydroxy group, $A^3$ is an aliphatic linking group, an aromatic linking group, or an aliphatic-aromatic linking group, and y is 0 or 1, and wherein $A^3$ is free of hydrogen atoms located on a carbon atom in a position beta to B when B is a hydroxy group, and B and $A^3$ are each free of sulfur atoms.

In another embodiment, a polyacrylate-polycarbonate copolymer consists essentially of: a polycarbonate block consisting essentially of aromatic carbonate units, or a combination of arylate ester units and aromatic carbonate units, and a polyacrylate block derived from a difunctional polyacrylate polymer having the formula $$Z^1\text{-}(M)_x\text{-}Z^2$$

wherein M is an acrylate block unit consisting essentially of a reaction residue of a (meth)acrylate monomer, a non-(meth)acrylate monomer, or a combination of a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $$\text{-}(A^3)_y\text{-}B,$$

wherein B is a hydroxy group or non-hydroxy group, $A^3$ an aliphatic linking group, an aromatic linking group, or an aliphatic-aromatic linking group, and y is 0 or 1, wherein $A^3$ is free of hydrogens located on a carbon atom in a position beta to B when B is a hydroxy group, and wherein B and $A^3$ are each free of sulfur atoms.

In another embodiment, a polyacrylate-polycarbonate copolymer comprises the reaction product of: a difunctional polyacrylate polymer having the formula $$Z^1\text{-}(M)_x\text{-}Z^2$$

wherein M is an acrylate block unit comprising a reaction residue of a (meth)acrylate monomer, a non-(meth)acrylate monomer, or a combination comprising a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $$\text{-}(A^3)_y\text{-}B,$$

wherein B is a reactive end group comprising a hydroxy group or non-hydroxy group, $A^3$ is an aliphatic linking group, an aromatic linking group, or an aliphatic-aromatic linking group, and y is 0 or 1, and wherein $A^3$ is free of hydrogen atoms located on a carbon atom in a position beta to B when B is a hydroxy group, and B and $A^3$ are each free of sulfur atoms; a dihydroxy aromatic compound, or a combination of a dihydroxy aromatic compound and a dicarboxylic acid derivative; a carbonyl compound; and a chain stopper.

In another embodiment, a thermoplastic composition comprises a blend of: a first polymer comprising a polyacrylate-polycarbonate copolymer comprising a polycarbonate block comprising aromatic carbonate units, and a polyacrylate block derived from a difunctional polyacrylate polymer having the formula

$Z^1\text{-}(M)_x\text{-}Z^2$ wherein M is an acrylate block unit comprising a reaction residue of a (meth)acrylate monomer, a non-(meth)acrylate monomer, or a combination comprising a (meth)acrylate and a non-(meth)acrylate monomer, wherein at least one acrylate block unit is a reaction residue of a (meth)acrylate monomer, x is greater than one, and $Z^1$ and $Z^2$ are each independently functionalized terminal groups of the formula

$\text{-}(A^3)_y\text{-}B$, wherein B is a reactive end group comprising a hydroxy group or non-hydroxy group, $A^3$ is an aliphatic linking group, an aromatic linking group, or an aliphatic-aromatic linking group, and y is 0 or 1, wherein $A^3$ is free of hydrogen atoms located on a carbon atom in a position beta to B when B is a hydroxy group, and B and $A^3$ are each free of sulfur atoms; and a second polymer comprising a polycarbonate polymer, wherein the first and second polymers are not identical, and wherein the polyacrylate block is derived from a difunctional, end group functionalized polyacrylate polymer prepared using reversible addition-fragmentation chain transfer polymerization, nitroxide-mediated polymerization, or atom transfer radical polymerization.

In another embodiment, an article comprising the polyacrylate-polycarbonate copolymer is disclosed.

The above described and other features are exemplified by the following detailed description.

DETAILED DESCRIPTION OF THE INVENTION

Surprisingly, a polyacrylate-polycarbonate copolymer comprising a polyacrylate block and a polycarbonate block has improved impact properties and improved weatherability when compared with other impact-modified polycarbonates, or polycarbonates modified with polysiloxane or polybutadiene blocks. Polyacrylate-polycarbonate copolymers having low $T_g$ polyacrylate blocks with a glass transition temperature ($T_g$) of $-20°$ C. or less can further have low haze of 5% or less. Further, thermoplastic compositions comprising the polyacrylate-polycarbonate copolymer provides other desirable properties such as, for example, high gloss retention adn low whiteness for improved deep, rich color capability.

As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

The polyacrylate-polycarbonate copolymer comprises polycarbonate blocks. As used herein, the terms "polycarbonate", "polycarbonate resin", and "polycarbonate block" means compositions having repeating structural carbonate units of the formula (1):

(1)

in which greater than or equal to 60 percent of the total number of $R^1$ groups are aromatic organic radicals and the balance thereof are aliphatic, alicyclic, or aromatic radicals. In one embodiment, each $R^1$ is an aromatic organic radical. In another embodiment, each $R^1$ is a radical of the formula (2):

$\text{-}A^1\text{-}Y^1\text{-}A^2\text{-}$  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. In another embodiment, $Y^1$ is a carbon-carbon bond (—) connecting $A^1$ and $A^2$.

Polycarbonates may be produced by the interfacial reaction of dihydroxy aromatic compounds having the formula HO—$R^1$—OH, which includes dihydroxy aromatic compounds of formula (3):

HO-$A^1$-$Y^1$-$A^2$-OH  (3)

wherein $Y^1$, $A^1$ and $A^2$ are as described above. Also included are bisphenol compounds of general formula (4):

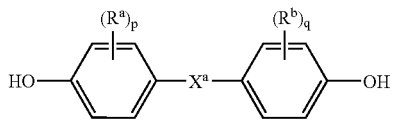
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

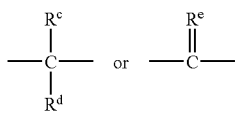
(5)

wherein $R^c$ and $R^d$ each independently represent a hydrogen atom or a monovalent linear alkyl or cyclic alkylene group and $R^e$ is a divalent hydrocarbon group. In an embodiment, $R^c$ and $R^d$ represent a cyclic alkylene group comprising carbon atoms, heteroatoms with a valency of two or greater, or a combination comprising at least one heteroatom and at least two carbon atoms. Exemplary heteroatoms include —O—, —S—, and —N(Z)—, where $Ar^1$ is a substituent group selected from hydrogen, halogen, hydroxy, $C_{1-12}$ alkyl, $C_{1-12}$ alkoxy, or $C_{1-12}$ acyl. Where present, the cyclic alkylene group may have 3 to 20 atoms, and may be a single saturated or unsaturated ring, or fused polycyclic ring system wherein the fused rings are saturated, unsaturated, or aromatic.

Exemplary polycarbonates may further include those derived from bisphenols containing alkyl cyclohexane units. Such polycarbonates have structural units corresponding to the formula (6):

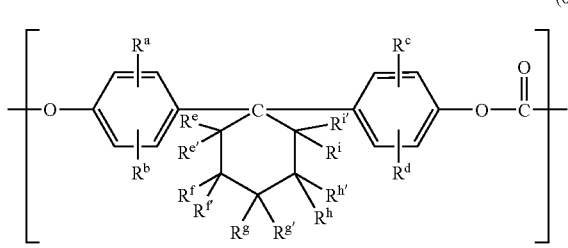
(6)

wherein $R^a$-$R^d$ are each independently hydrogen, $C_{1-12}$ alkyl, or halogen; and substituents $R_e$-$R_i$ and $R_{e'}$-$R_{i'}$ are each independently hydrogen or $C_{1-12}$ alkyl. The substituents may be aliphatic or aromatic, straight-chain, cyclic, bicyclic, branched, saturated, or unsaturated. In a specific embodiment, alkyl cyclohexane-containing bisphenols, for example the reaction product of two moles of a phenol with one mole of a hydrogenated isophorone, are useful for making polycarbonate polymers with high glass transition temperatures and high heat distortion temperatures. Such isophorone bisphenol-containing polycarbonates correspond to formula (6), wherein each of $R_f$, $R_{f'}$, and $R_h$ are methyl groups; $R_e$, $R_{e'}$, $R_g$, $R_{g'}$, $R_{h'}$, $R_i$, and $R_{i'}$ are each hydrogen; and $R_a$-$R_d$ are as defined above. These isophorone bisphenol based polymers, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC® trade name.

Some illustrative, non-limiting examples of dihydroxy aromatic compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy aromatic compounds may also be used.

Another dihydroxy aromatic group $R^1$ is derived from a dihydroxy aromatic compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

In an embodiment, useful polycarbonate blocks are derived from dihydroxy aromatic compounds of formula (3). In a specific embodiment, polycarbonate blocks comprise bisphenol-A carbonate repeat units. In another specific embodiment, polycarbonate blocks may comprise a combination of carbonate repeat units derived from dihydroxy aromatic compounds of formula (3), formula (4), formula (7), or a combination comprising at least one of the foregoing dihydroxy aromatic compounds. In an embodiment, the polycarbonate blocks comprise 10 to 99.9 wt %, specifically 20 to 99.5 wt %, more specifically 30 to 99 wt %, and still more specifically, 50 to 99 wt %, of the total weight of the polyacrylate-polycarbonate copolymer.

In a specific embodiment, where a combination of polymers is used, an exemplary polycarbonate for mixing is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight ($M_w$) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates useful for the formation of thin articles may have an MVR, measured at 300° C. under a load of 1.2 kg according to ASTM D1238-04, of 0.5 to 80 cubic centimeters per 10 minutes (cc/10 min). In a specific embodiment, an exemplary thermoplastic composition has an MVR measured at 300° C. under a load of 1.2 kg according to ASTM D1238-04, of 0.5 to 100 cc/10 min, specifically 1 to 75 cc/10 min, and more specifically 1 to 50 cc/10 min. Combinations of polycarbonates of different flow properties may be used to achieve the overall desired flow property.

In an embodiment, where a polycarbonate is used, the polycarbonate may have a light transmittance greater than or equal to 70%, specifically greater than or equal to 75% and more specifically greater than or equal to 80%, as measured at 3.2±0.12 millimeters thickness according to ASTM D1003-00. The polycarbonate may also have a haze less than or equal to 10%, specifically less than or equal to 5%, and most specifically less than or equal to 2%, as measured at 3.2±0.12 millimeters thickness according to ASTM D1003-00.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, and combinations comprising homopolycarbonates, copolycarbonates, or a combination comprising at least one of the foregoing. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating ester units of formula (8):

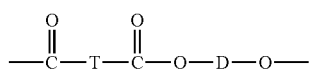

(8)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from a dihydroxy aromatic compound of formula (4) above. In another embodiment, D is derived from a dihydroxy aromatic compound of formula (7) above.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene radical and T is p-phenylene, m-phenylene, naphthalene, a divalent cycloaliphatic radical, or a combination thereof. This class of polyester includes the poly(alkylene terephthalates).

In addition to the ester units, the polyester-polycarbonates comprise carbonate units as described hereinabove. Carbonate units of formula (1) may also be derived from dihydroxy aromatic compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof)

with resorcinol, bisphenol A, or a combination comprising at least one of the foregoing, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20.

The polyester-polycarbonates may have an $M_w$ of 10,000 to 100,000 g/mol, specifically 15,000 to 50,000 g/mol, and more specifically 18,000 to 40,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min.

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as, for example, triethylamine or a phase transfer catalyst, under controlled pH conditions, e.g., 8 to 11.5. The most commonly used water immiscible solvents include methylene chloride, 1,2-dichloroethane, chlorobenzene, toluene, and the like. Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates. Where a chain stopper is incorporated with the polycarbonate, the chain stopper may also be referred to as an end group.

For example, mono-phenolic compounds useful as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with up to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Among the phase transfer catalysts that may be used in interfacial polymerization are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. In an embodiment, a specifically useful phase transfer catalyst is $CH_3[CH_3(CH_2)_3]_3NCl$ (methyl tri-n-butyl ammonium chloride). An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of dihydroxy aromatic compound in the phosgenation mixture.

Polyester-polycarbonates may also be prepared by interfacial polymerization. Rather than utilizing the dicarboxylic acid per se, it is possible, and sometimes even preferred, to employ the reactive derivatives of the acid, such as the corresponding dicarboxylic acid dihalides, in particular the dicarboxylic acid dichlorides and the dicarboxylic acid dibromides. Thus, for example instead of using isophthalic acid, terephthalic acid, or combinations thereof, it is possible to employ isophthaloyl dichloride, terephthaloyl dichloride, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl)carboxylate, or a combination comprising at least one of the foregoing. In addition, useful transesterification catalysts may include phase transfer catalysts of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxy, carboxyl, carboxylic anhydride, haloformyl, and combinations of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05 to 2.0 wt % of the polycarbonate. All types of polycarbonate end groups are contemplated as being useful in the polycarbonate, provided that such end groups do not significantly affect desired properties of the thermoplastic compositions.

The polyacrylate-polycarbonate copolymer comprises, in addition to a polycarbonate block, a polyacrylate block of general formula (9):

wherein M is an acrylate block unit, x is greater than one, and the polyacrylate block is difunctional. Acrylate block units, as defined herein, are monomeric or oligomeric subunits of the polyacrylate block. It will be understood that, as used herein and where given, the number of acrylate block units represents the average number of acrylate block units present in a polyacrylate polymer or polyacrylate block derived therefrom, and is sometimes referred to herein as the degree of polymerization. Thus, in an embodiment, the degree of polymerization of the polyacrylate block, as represented in formula (9) by x, is 5 to 1,000. Acrylate block units are derived from acrylate and/or methacrylate monomers (referred to collectively herein as "(meth)acrylate" monomers), and/or non-(meth)acrylate monomers that are copolymerizable with (meth)acrylate monomers, provided, however, that at least one acrylate block unit present in the polyacrylate block comprises a residue of a (meth)acrylate monomer. Thus, in an embodiment, M is an acrylate block unit comprising a reaction residue of a (meth)acrylate monomer, a non-(meth)acrylate monomer, or a combination comprising a (meth)acrylate and a non-(meth)acrylate monomer, in which at least one acrylate block unit comprises a residue of a (meth)acrylate monomer. More than one type of acrylate block unit may be present in the polyacrylate block, and thus the polyacrylate block may be, within and including the limitations of formula (9), a copolymer block, a terpolymer block, a tetrapolymer block, a pentapolymer block, or the like. It is further understood that the polyacrylate block structure shown in general formula (9) does not imply any specific structure for the polyacrylate block, and that, where more than one type of acrylate block unit is present, arrangements of acrylate block units within the polyacrylate block may comprise a block structure, a polyblock structure, an alternating structure, a random structure, or a combination comprising two or more of these structural arrangements. In an embodiment, a polyacrylate-polycarbonate copolymer comprises a polycarbonate block comprising aromatic carbonate units, and a polyacrylate block derived from a difunctional polyacrylate polymer. In another embodiment, a polyacrylate-polycarbonate copolymer consists essentially of a polycarbonate block consisting essentially of aromatic carbonate units, or a combination of arylate ester units and aromatic carbonate units, and a polyacrylate block derived from a difunctional polyacrylate polymer wherein acrylate block unit M consists essentially of the reaction residue of a (meth)acrylate monomer, a non-(meth)acrylate monomer, or a combination of a (meth)acrylate and a non-(meth)acrylate monomer, and at least one acrylate block unit is a reaction residue of a (meth)acrylate monomer.

Acrylate block unit M comprises a (meth)acrylate unit of formula (10):

wherein each R and R' is independently a hydrogen or $C_1$-$C_{30}$ alkyl group. Acrylate block unit M may further comprise substituted vinyl units of formula (11):

wherein R" is a hydrogen or $C_1$-$C_{30}$ alkyl group; and $X^a$ is a hydrogen, a substituted $C_6$-$C_{20}$ aryl group, unsubstituted $C_6$-$C_{20}$ aryl group, nitrile group, amide group, halogen group, or $C_1$-$C_{12}$ alkoxy group. When present, substituents on the aryl groups may include, for example, nitro, cyano, hydroxy, thio, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy. In an embodiment, where acrylate block units of formula (11) are included in the polyacrylate block, at least one acrylate block unit is derived from a (meth)acrylate monomer.

Exemplary R and R' groups for formula (10), and R" groups for formula (11), include hydrogen, methyl, ethyl, n-propyl, isopropyl, n-butyl, t-butyl, n-pentyl, 2-pentyl, 3-pentyl, isopentyl, neopentyl, n-hexyl, n-octyl, 2-ethylhexyl, cyclohexyl, methylcyclohexyl, 4-ethylcyclohexyl, 4-ethylcyclohexyl-2-ethyl, n-dodecyl, n-octadecyl, camphoryl, adamantyl, norbornylalkyl, and the like. Exemplary $X^a$ groups for formula (11) include cyano, phenyl, 2-methylphenyl, 3-methylphenyl, 4-methylphenyl, 3,5-dimethylphenyl, 2,3-dimethylphenyl, 2,4-dimethylphenyl, 2,5-dimethylphenyl, 2,6-dimethylphenyl, 2,3,4-trimethylphenyl, 2,3,5-trimethylphenyl, 3,4,5-trimethylphenyl, 2,4,6-trimethylphenyl, 4-ethylphenyl, 4-butylphenyl, 4-tert-butylphenyl, 2-trifluoromethylphenyl, 4-trifluoromethylphenyl, 4-acetylphenyl, 4-acetoxyphenyl, 4-methoxyphenyl, 4-tert-butoxyphenyl, 4-fluorophenyl, 4-chlorophenyl, 4-bromophenyl, naphthyl, $C_1$-$C_{12}$ alkyl-substituted naphthyl, $C_1$-$C_{12}$ alkyl ether-substituted naphthyl, halogen-substituted naphthyl, —$OCH_3$, —$OCH_2CH_3$, —O-t-butyl, —O-n-butyl, —O-n-octyl, and the like.

In an embodiment, where a combination of acrylate block units of formula (10) and formula (11) is used in the polyacrylate block, the respective molar ratio of these units is 100:0 to 70:30, specifically 100:0 to 75:25, more specifically 100:0 to 80:20, and still more specifically 100:0 to 85:15. It will be understood by one skilled in the art that more than one type of acrylate block unit of formula (10) or (11) may be present in copolymer blocks of general formula (9). In addition, the polyacrylate block may include additional monomers such as branched monomers, oligomeric or polymeric grafts, or other functional monomers including cyclic unsaturated monomers, hydrolysable olefinically unsaturated monomers, oligomers having polymerizable styrenic, allylic, vinylic, or methacrylic functionality, and the like, where the presence of such monomers in the polyacrylate block does not significantly adversely affect the desired properties of the polyacrylate-polycarbonate.

The polyacrylate block is derived from a reaction residue of a polyacrylate polymer. In an embodiment, the degree of polymerization for the polyacrylate polymer, and for a polyacrylate block derived therefrom, is less than or equal to 1,000, specifically less than or equal to 800, more specifically less than or equal to 500, and still more specifically less than or equal to 300. In a specific embodiment, the degree of polymerization for the polyacrylate polymer, and for a polyacrylate block derived therefrom, is less than or equal to 220, specifically less than or equal to 150, specifically less than or equal to 100, and more specifically less than or equal to 70, more specifically less than or equal to 50. In another embodiment, the degree of polymerization for the polyacrylate polymer, and for a polyacrylate block derived therefrom, is greater than or equal to 5, specifically greater than or equal to 7, more specifically greater than or equal to 10, and still more specifically greater than or equal to 15.

The polyacrylate polymer has a number averaged molecular weight ($M_n$) of less than or equal to 100,000 g/mol, specifically less than or equal to 90,000 g/mol, and more specifically less than or equal to 80,000 g/mol. The polyacrylate polymer also has an $M_n$ of greater than or equal to 500 g/mol, specifically greater than or equal to 700 g/mol, and more specifically greater than or equal to 1,000 g/mol. Similarly, the polyacrylate polymer has a weight averaged molecular weight ($M_w$) of less than or equal to 100,000 g/mol, specifically less than or equal to 90,000 g/mol, and more specifically less than or equal to 80,000 g/mol. The polyacrylate polymer also has an $M_w$ of greater than or equal to 500 g/mol, specifically greater than or equal to 700 g/mol, and more specifically greater than or equal to 1,000 g/mol.

In a specific embodiment, the polyacrylate polymer, and any polyacrylate block derived therefrom, has an $M_n$ of less than or equal to 20,000 g/mol, specifically less than or equal to 15,000 g/mol, more specifically less than or equal to 10,000 g/mol, still more specifically less than or equal to 7,000 g/mol, and still yet more specifically less than or equal to 5,000 g/mol. The polyacrylate polymer and block derived therefrom also have an $M_n$ of greater than or equal to 500 g/mol, specifically greater than or equal to 700 g/mol, more specifically greater than or equal to 1,000 g/mol, and still more specifically greater than or equal to 1,500 g/mol. Similarly, in a specific embodiment, the polyacrylate polymer and block derived therefrom has an $M_w$ of less than or equal to 20,000 g/mol, specifically less than or equal to 15,000 g/mol, more specifically less than or equal to 10,000 g/mol, still more specifically less than or equal to 7,000 g/mol, and still yet more specifically less than or equal to 5,000 g/mol. The polyacrylate polymer and block derived therefrom also have an $M_w$ of greater than or equal to 500 g/mol, specifically greater than or equal to 700 g/mol, more specifically greater than or equal to 1,000 g/mol, and still more specifically greater than or equal to 1,500 g/mol. Molecular weights for the polyacrylate polymers, and the polyacrylate blocks derived therefrom, are determined by gel permeation chromatography (GPC) using a crosslinked styrene-divinyl benzene column, calibrated using polystyrene standards, and using a sample concentration of 1 mg/ml.

In an embodiment, the polyacrylate block has a $T_g$ lower than that of the polycarbonate block, or polyester blocks where used, and with which it forms a copolymer. The polyacrylate block has a $T_g$ less than or equal to −20° C., more specifically less than or equal to −25° C., still more specifically less than or equal to −30° C., and still more specifically less than or equal to −35° C. The polyacrylate blocks may also have a $T_g$ greater than or equal to −80° C., specifically greater than or equal to −75° C., more specifically greater than or equal to −70° C., and still more specifically greater than or equal to −65° C.

The polyacrylate block may also have a thermal stability, i.e., a resistance to thermal decomposition processes, under melt processing conditions at temperatures of less than or equal to 250° C., specifically less than or equal to 245° C., more specifically less than or equal to 240° C., and still more specifically less than or equal to 235° C.

The polyacrylate block is derived from a functional end-capped polyacrylate polymer of general formula (12):

$$Z^1\text{-}(M)_x\text{-}Z^2 \qquad (12)$$

wherein M and x are as described for formula (9) above. Also in formula (12), $Z^1$ and $Z^2$ are each independently terminal groups having a free (i.e., reactive) functional groups. It is desired that the terminal groups are complementary to and capable of a bond-forming reaction with other molecules having acid groups, carbonate groups, acid chloride groups, chloroformate groups, phosgene, hydroxy groups, or a combination of the foregoing. The terminal groups $Z^1$ and $Z^2$ may each independently be of general formula (13):

$$\text{-}(A^3\text{-})_y\text{—B} \qquad (13)$$

wherein $A^3$ is an aliphatic linking group, an aromatic linking group, or an aliphatic-aromatic linking group. In an embodiment, $A^3$ is a branched or straight chain, substituted or unsubstituted $C_1$-$C_{30}$ alkylene group, $C_1$-$C_{30}$ heteroalkylene group, $C_7$-$C_{30}$ arylene-alkylene group, $C_7$-$C_{30}$ arylene-heteroalkylene group, $C_7$-$C_{30}$ alkylene-arylene group, or $C_7$-$C_{30}$ heteroalkylene-arylene group. Where $A^3$ comprises heteroalkylene substructures comprising structural heteroatoms, the heteroatoms may include oxygen, nitrogen, phosphorous, and silicon. Where $A^3$ is substituted, the substituents may include, for example, nitro, cyano, hydroxy, imide, amide, phosphate, phosphite, carbonyl, carboxylate, carboxylamide, urea, carbamate, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy. Also in formula (13), B is a functional end group comprising hydroxy, phenolic hydroxy, carboxylic acid, carboxylate salt, aliphatic carboxylate ester, aromatic carboxylate ester, carboxylic anhydride, carboxylic acid chloride, chloroformate, aryl carbonate, aliphatic amine, aromatic amine, imide, or imide salt; and y is 0 or 1. In an embodiment, where $A^3$ is an aliphatic linking group, $A^3$ is free of hydrogens located on a carbon atom in a position beta to B (also referred to herein as "beta-hydrogens"). In a specific embodiment, the polyacrylate block is derived from a hydroxy-terminated polyacrylate polymer having no beta-hydrogens in the linking group (group $A^3$) adjacent to the terminal hydroxy group (group B). Beta-hydrogens are known to be thermally unstable when used during high processing temperatures of polycarbonates. An example of a hydroxy-containing end group having beta-hydrogens is a 2-hydroxyethyl group. In another embodiment, B and $A^3$ are free of sulfur atoms. In a specific embodiment, $A^3$ and B are chosen as to not contain any thioether groups due to the relatively high odor caused by the thioether compounds at polycarbonate processing temperatures. Thus, exemplary terminal groups $Z^1$ and $Z^2$ for the polyacrylate polymer include aliphatic hydroxy, phenolic hydroxy, aromatic carboxylic acid, aliphatic carboxylic acid, aliphatic carboxylate ester, aromatic carboxylate ester, carboxylic acid anhydride, carboxylic acid chloride, chloroformate, aryl carbonate, aliphatic amine, aromatic amine, maleimide, or a combination comprising any two of these end groups. In an embodiment, a terminal group can be a phenol group, para-substituted phenol group, neopentyl hydroxy group, propionic acid, 2-methylpropionic acid, pentyl amine, phenyl carbonate end group, substituted phenyl carbonate end group, phenyl chloroformate group, maleimide, N-substituted maleimide, or a combination comprising at least one of the foregoing terminal groups. It is understood that these terminal groups are meant to be exemplary and are not to be considered as limiting thereto.

In an embodiment, the polyacrylate block may be derived from a polyacrylate polymer. In an embodiment, the polyacrylate polymer from which the polyacrylate block is derived may be a homopolymer or copolymer of general formula (12) wherein acrylate block units M comprise units of formula (10), to give a polymer having formula (14):

$$Z'\text{-}(CH_2CRC(O)OR')_m\text{-}Z^2 \qquad (14)$$

wherein each R and R' is independently as defined in formula (10), and m is 5 to 1,000. Also in formula (14), $Z^1$ and $Z^2$ are each independently terminal groups as defined in formula (13), above.

In another embodiment, the polyacrylate polymer from which the polyacrylate block is derived may be a copolymer of formula (12), wherein acrylate block units M comprise units of formulas (10) and (11),to give a polymer having formula (15):

$$Z'\text{-}(CH_2CRC(O)OR')_m\text{—}(CH_2CR''X^a)_n\text{-}Z^2 \qquad (15)$$

wherein R, R', R'', $X^a$, $Z^1$, and $Z^2$ are as described for formulas (10), (11), and (13) above, and wherein m is 1 to 1,000, n is 0 to 999, and the sum of m+n is 5 to 1,000.

In another embodiment, the polyacrylate-polycarbonate copolymer may comprise a polyacrylate block derived from the polyacrylate polymer having formula (16):

$$Z^1\text{-}(CH_2CRC(O)OR')_{m'}\text{—}(CH_2CR''X^a)_{n'}\text{-}L\text{-}(CH_2CRC(O)OR')_{m''}\text{—}(CH_2CR''X^a)_{n''}\text{-}Z^2 \qquad (16)$$

wherein each R, R', R'', $X^a$, $Z^1$, and $Z^2$ are as described for formula (12) above, and wherein m' and m'' are each individually 1 to 999, n' and n'' are each individually 0 to 999, and wherein the sum of m'+m''+n'+n'' is 5 to 1,000. Also in formula (16) is difunctional linking group L, wherein L is a branched or straight chain, symmetric or asymmetric, substituted or unsubstituted $C_1$-$C_{30}$ alkylene group, $C_1$-$C_{30}$ heteroalkylene group, $C_8$-$C_{30}$ arylene-alkylene group, $C_8$-$C_{30}$ arylene-heteroalkylene group, $C_8$-$C_{30}$ alkylene-arylene group, or $C_8$-$C_{30}$ heteroalkylene-arylene group. Where L comprises heteroalkylene substructures comprising structural heteroatoms, the heteroatoms may include oxygen, nitrogen, phosphorous, and silicon. Where L is substituted, the substituents may include, for example, nitro, cyano, hydroxy, phosphate, phosphite, sulfonate, sulfinate, carbonyl, carboxylate, carboxylamide, urea, thiourea, carbamate, trithiocarbonate, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy.

The polyacrylate polymer comprises the polymerized product of at least one olefinically unsaturated monomer, wherein the monomers(s) when polymerized are referred to as acrylate block units derived from the monomers. Monomers which may be used include acrylate monomer, methacrylate monomer, unsaturated vinyl compounds, unsaturated olefinic compounds, styrenic compounds, or a combination comprising at least one of the foregoing. Exemplary monomers include acrylate and methacrylate monomers such as those having formula (17):

$$H_2C\text{=}CRC(O)OR' \qquad (17)$$

wherein R and R' are as described for formula (10) above. Useful (meth)acrylate monomers include $C_{1-8}$ alkyl (meth)acrylates, $C_{6-20}$ alkyl (meth)acrylates, and $C_{6-20}$ alkylaryl (meth)acrylates. Exemplary monomers of formula (17) include, (meth)acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, phenyl methacrylate, benzyl (meth)acrylate, phenethylmethacrylate, and the like, and combinations comprising at least one of the foregoing monomers. Of these, specifically useful monomers include n-butyl acrylate, ethyl acrylate, and 2-ethylhexyl acrylate. Combinations of the foregoing (meth)acrylate monomers may also be used.

Other vinyl monomers that may be copolymerized with the (meth)acrylate monomers include vinyl compounds of formula (18):

$$H_2C\text{=}CR''X^a \qquad (18)$$

wherein R'' and $X^a$ are as described for formula (11) above. Exemplary comonomers include but are not limited to (meth)acrylonitrile, (meth)acrylamide, N,N-dimethyl (meth)acrylamide, N-cyclohexylacrylamide, N-2-hydroxyethyl (meth)acrylamide, methyl vinyl ether, a vinylalkoxysilane, an allylalkoxysilane, and combinations comprising at least one of the foregoing comonomers. Other exemplary monomers that may be used include those having reactive functional groups such as (acryloxy)alkoxysilanes including gamma-(methacryloxypropyl)trimethoxysilane, and gamma-((methacryl oxypropyl)dimethoxy) methylsilane.

Where $X^a$ is an aryl group, the vinyl monomer can include monovinylaromatic monomers of formula (19):

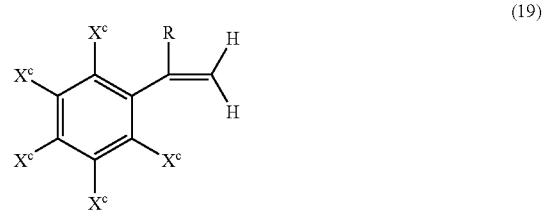

(19)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Exemplary monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, vinylxylene, butylstyrene, para-hydroxystyrene, methoxystyrene, and the like, and combinations comprising at least one of the foregoing compounds. Styrene and/or alpha-methylstyrene are specifically useful monovinyl aromatic monomers.

The polyacrylate polymers from which the polyacrylate block is derived may be prepared using any of a number of methods for preparing polyacrylate polymers with suitable end group functionalization. Polymerization methods based on conventional radically initiated addition polymerization may be useful, where the polymer produced by such methods have functionalizable end-groups that are useful for copolymerization to form polyacrylate-polycarbonates. Methods such as solution polymerization methods, metered addition/high solids polymerization, emulsion polymerization, and other similar free radical polymerization methods, may be useful.

Specifically useful addition polymerization methods include those providing a polyacrylate copolymer having well defined block sizes. A useful class of well defined, narrow polydispersity polyacrylate polymers are telechelic oligomers, having end groups functionalized with functional groups useful for reacting to form polyacrylate-polycarbonates. The polyacrylate polymers are desirably difunctional. Telechelic oligomers, sometimes also referred to as "macromers", are known in the art, and may be prepared using different controlled free-radical polymerization methods. As defined herein, "controlled free-radical polymerization" (also referred to as "CFRP") is class of methods for building polymer chains having a substantially uniform molecular weight, in an addition polymerization. As used herein, a "substantially uniform molecular weight" of a polymer is one where the polydispersity, i.e., the ratio of weight averaged molecular weight ($M_w$) to the number averaged molecular weight ($M_n$), approaches a value of 1. Polydispersities for telechelic oligomers may be less than or equal to 2, specifically less than or equal to 1.8, more specifically less than or equal to 1.5, and still more specifically less than or equal to 1.2. The polydispersity of a telechelic oligomer may also be greater than or equal to 1.01, specifically greater than or equal to 1.02, more specifically greater than or equal to 1.03, and still more specifically greater than or equal to 1.05.

Exemplary CFRP polymerization methods known in the art include, for example, such methods as reversible addition-fragmentation chain transfer (RAFT), which uses a combination of a free radical initiator such as a diazo initiator in combination with a dithio-ester-containing chain transfer agent where a dithioester group is connected to the living radical chain end; other degenerative transfer processes using iodine or sulfur mediated block transfer, including iniferters (which stands for "initiator-chain transfer-terminators"), that are initated using ultraviolet radiation; Atom Transfer Radical Polymerization (ATRP), in which a polymerizable carbon radical is thermally reversibly bonded to a halide atom which is exchanged with a metal chelate such as a copper amine or copper imine complex, whereupon olefinically unsaturated monomers can add to the polymerizable radical upon thermally initiated decomplexation of the metal chelate; Nitroxide Mediated Polymerization, with the acronym NMP, in which a polymerizable carbon radical is thermally reversibly generated by heating an initiator or polymer with nitroxide-capped dormant chain ends, whereupon olefinically unsaturated monomers can add to the polymerizable radical upon dissociation of the nitroxide; group transfer polymerization (GTP), in which a silyl ketene acetal is used to initiate and mediate the polymerization of acrylate, methacrylate, or vinyl ether monomers, by chain propagation which proceeds through an anionic pericyclic intermediate. Each of these methods can allow for different end-group chemistries suitable for end-group modification of the telechelic oligomers as described above, wherein the desired end groups may be obtained either directly, or with modification of the post-polymerization end-group functionality, to prepare end-group functional acrylate polymers having the desired reactive groups for polymerizing with carbonate units to form the polyacrylate-polycarbonate. Of these CFRP methods, those specifically useful herein include RAFT, ATRP, and NMP methods.

In an embodiment, a polyacrylate polymer may be formed by polymerization of a monomer of formula (17), and where desired, a monomer of formulas (18) or (19), using reversible addition-fragmentation chain transfer (RAFT) process. The RAFT process is a liquid phase addition polymerization process initiated using thermally decomposable diazo initiators of formula (20):

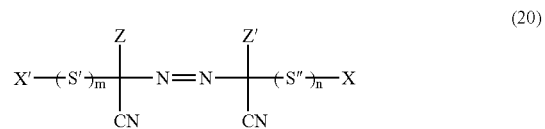

(20)

wherein X and X' are each independently —COOH, —OH, —O—C(O)—R" (where R"=is aliphatic or substituted aliphatic group and is hydrolyzable or cleavable by thermolysis), or O—CO—O—$Ar^T$ (where $Ar^T$ is a substituted or unsubstituted aryl group). When present, substituents on $Ar^T$ may include, for example, nitro, cyano, hydroxy, thio, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy.

Also in formula (20), S' and S" are each independently spacer units. Each spacer unit S' or S" may independently be a branched or straight chain, substituted or unsubstituted $C_1$-$C_{30}$ alkylene group, $C_1$-$C_{30}$ heteroalkylene group, $C_7$-$C_{30}$ arylene-alkylene group, $C_7$-$C_{30}$ arylene-heteroalkylene group, $C_7$-$C_{30}$ alkylene-arylene group, or $C_7$-$C_{30}$ heteroalkylene-arylene group. Where S' and/or S" comprise heteroalkylene substructures comprising structural heteroatoms, the heteroatoms may include oxygen, nitrogen, phosphorous, and silicon. Where S' and/or S" is substituted, the substituents may include, for example, nitro, cyano, hydroxy, phosphate, phosphite, carbonyl, carboxylate, carboxylamide, urea, carbamate, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy. Also in formula (20), Z and Z' are each independently $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy. Also in formula (20), m and n are each greater than or equal to 1.

In addition to the initiator of formula (20), the RAFT process includes a chain transfer agent (CTA) of formula (21):

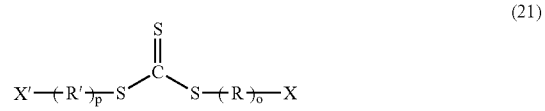

(21)

where X and X' are as defined in formula (20); R and R' are each spacer units; and o and p are greater than or equal to 1. Each spacer unit R and/or R' may independently be a branched or straight chain, substituted or unsubstituted $C_1$-$C_{30}$ alkylene group, $C_1$-$C_{30}$ heteroalkylene group, $C_7$-$C_{30}$ arylene-alkylene group, $C_7$-$C_{30}$ arylene-heteroalkylene group, $C_7$-$C_{30}$ alkylene-arylene group, or $C_7$-$C_{30}$ heteroalkylene-arylene group. Where R or R' comprise heteroalkylene substructures comprising structural heteroatoms, the heteroatoms may include oxygen, nitrogen, phosphorous, and silicon. Where R or R' is substituted, the substituents may include, for example, nitro, cyano, hydroxy, phosphate, phosphite, carbonyl, carboxylate, carboxylamide, urea, carbamate, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy.

Exemplary monomers which may be polymerized using RAFT process include acrylates, methacrylates, acrylamides, N-substituted acrylamides, styrenes, substituted styrenes, and the like, or a combination comprising at least one of the foregoing. In addition, block and/or random copolymers comprising the above monomers, and including end groups or graft groups which may be copolymerized with any of the above monomers, may be included. For example, the RAFT process can be used in a controlled free radical polymerization of n-butyl acrylate provide hydroxy and carboxy-telechelic poly(n-butyl acrylate)s.

Polymers prepared by RAFT process using an initiator of formula (20) and a chain transfer agent (CTA) of formula (21) can thus have structures of formulas (22)-(26):

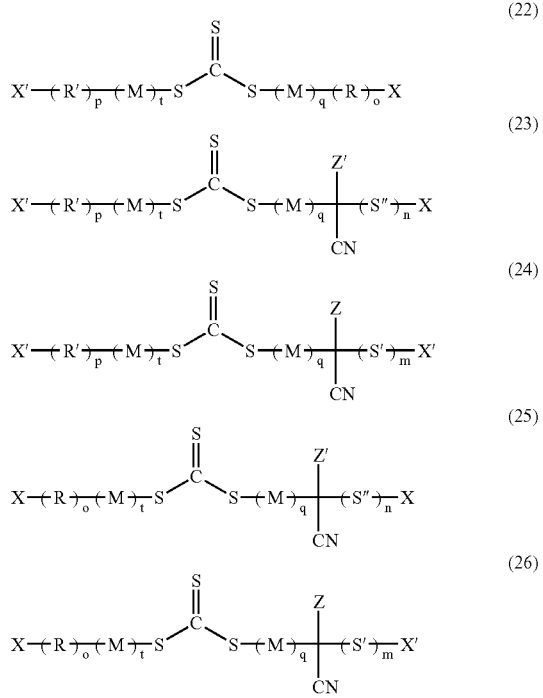

wherein, in each of formulas (22)-(26), M is as described in formula (9), above, and t and q are each independently 5 to 1,000, wherein the sum of t and q is 5 to 1,000. It is also understood additional chemical structures may be obtained from the polymerization of an unsaturated monomer with an initiator of formula (20) and CTA of formula (21); however, polymers having structures of formulas (22)-(26) typically predominate in the polymer structures that may be obtained under typical RAFT process conditions, and using these components.

The molecular weight and degree of polymerization of the polymer produced by the RAFT process (as defined by the average number of repeating units, i.e., acrylate block units, in the polyacrylate polymer) are determined by the ratio of the monomer concentration [M] to the chain transfer agent (CTA) concentration [CTA], assuming a 100% conversion of monomer.

Thus, in an embodiment, where the RAFT process is used to polymerize the (meth)acrylate and/or other monomers, a ratio [M]/[CTA] can be used to provide a degree of polymerization, as represented by the average number of acrylate block units M in a polyacrylate polymer, of 5 to 1,000. In a specific embodiment, a ratio [M]/[CTA] can be used to provide a degree of polymerization, as represented by the average number of acrylate block units M in a polyacrylate polymer, of 5 to 220.

In an embodiment, polymers of formulas (22)-(26), as polymerized using RAFT process, and where X and X' are COOH, R, R', S', and S" are aliphatic spacer units, and m, n, o, and p are greater than or equal to 1, are copolymerizable with a dihydroxy aromatic compound of general structure HO—R'—OH and a carbonyl source, to provide a polyacrylate-polycarbonate copolymer wherein the polyacrylate unit links to the polyester unit by an ester link. In an exemplary embodiment, a polymer for copolymerization to form a polyacrylate-polycarbonate is represented by formula (27):

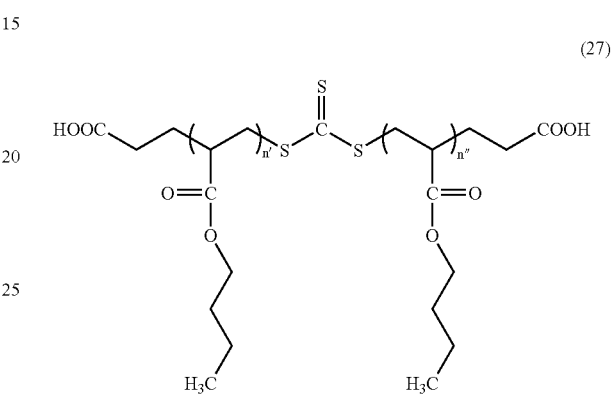

where n' and n" are each independently 5 to 1,000, wherein the sum of n' and n" is 5 to 1,000.

In another embodiment, polymers of formulas (22)-(26), as polymerized using the RAFT process, and where X and X' are OH, R, R', S', and S" are aliphatic spacer units, and m, n, o, p are greater than or equal to 1. Phenolic —OH groups may be derived from precursor end groups wherein X and X' are acetyl esters of phenolic OH groups (aryl-O—C(O)—CH$_3$), which can be hydrolyzed under acidic conditions to remove the acetyl group. A polymer having phenolic end groups of this structure are copolymerizable with a dihydroxy aromatic compound of general structure HO—R'—OH and a carbonyl source, to provide a polyacrylate-polycarbonate copolymer wherein the polyacrylate unit links to the polyester unit by a carbonate link. The structure of an exemplary polymer is shown in formula (28):

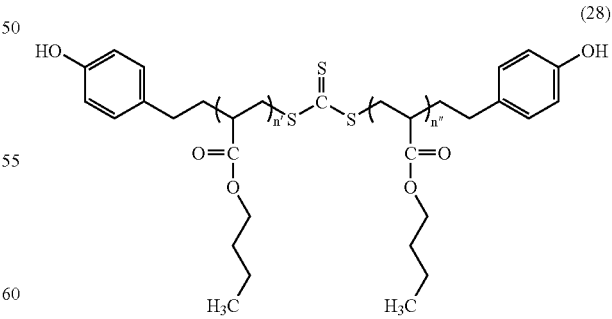

where n' and n" are as described for formula (27) above.

Polyacrylate polymers may also be formed by polymerization of a monomer of formula (17), and where desired, a monomer of formulas (18) or (19), using nitroxide-mediated polymerization (NMP). The NMP process is a liquid phase addition polymerization process initiated using thermally decomposable, nitroxide containing initiators. Such initiators may be of general formula (29):

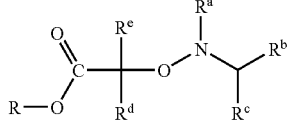

(29)

wherein each of $R^a$, $R^b$, $R^d$, and $R^e$ are each individually a $C_{1-20}$ alkyl, substituted $C_{1-20}$ alkyl, $C_{3-30}$ cycloalkyl, substituted $C_{3-30}$ cycloalkyl, $C_{7-30}$ alkylaryl, substituted $C_{7-30}$ alkylaryl, $C_{7-30}$ arylcycloalkyl, substituted $C_{7-30}$ arylcycloalkyl, $C_{7-30}$ arylalkyl, or substituted $C_{7-30}$ arylalkyl; and $R^c$ is H, $C_{6-30}$ aryl, substituted $C_{6-30}$ aryl, or a di-$C_{1-20}$ alkyl-substituted phosphite. Also in formula (29), R is H, $C_{1-30}$ alkyl, substituted $C_{1-30}$ alkyl, $C_{6-30}$ aryl, substituted $C_{6-30}$ aryl, $C_{7-30}$ alkylaryl, substituted $C_{7-30}$ alkylaryl, $C_{7-30}$ arylalkyl, or substituted $C_{7-30}$ arylalkyl. Where a substituent is used but not specified, the substituent may be a halogen, carbonyl group, $C_{1-30}$ acyl group, $C_{1-30}$ acyloxy group, hydroxy group, and the like.

In an embodiment, the NMP initiator may comprise a 5 or 6 membered ring comprising a nitrogen heteroatom. Such initiators may have structures corresponding to formulas (30) or (31):

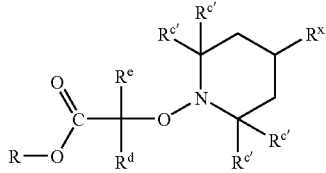

(30)

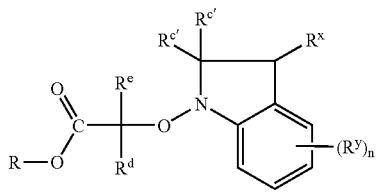

(31)

wherein for each of formulas (30) and (31), $R^d$ and $R^e$ are as described in formula (29). Also for formulas (30) and (31), each occurrence of $R^{c'}$ is individually $C_{1-20}$ alkyl, substituted $C_{1-20}$ alkyl, $C_{3-30}$ cycloalkyl, substituted $C_{3-30}$ cycloalkyl, $C_{7-30}$ alkylaryl, substituted $C_{7-30}$ alkylaryl, $C_{7-30}$ arylcycloalkyl, substituted $C_{7-30}$ arylcycloalkyl, $C_{7-30}$ arylalkyl, or substituted $C_{7-30}$ arylalkyl; and $R^x$ is H, oxo, $C_{1-20}$ alkylimino, $C_{1-20}$ alkyl, $C_{3-30}$ cycloalkyl, $C_{6-30}$ aryl, $C_{6-30}$ arylimino, $C_{7-30}$ alkylaryl, $C_{7-30}$ arylalkyl, halogen, nitrile, hydroxy, $C_{1-20}$ alkoxy, $C_{6-30}$ aryloxy, $C_{1-20}$ acyl, or $C_{1-20}$ alkylcarboxylate. In formula (31), $R_y$ is individually H, $C_{1-20}$ alkyl, $C_{3-30}$ cycloalkyl, $C_{7-30}$ alkylaryl, $C_{7-30}$ arylalkyl, halogen, hydroxy, $C_{1-20}$ alkoxy, $C_{1-20}$ acyl, or $C_{1-20}$ alkylcarboxylate; and n is 0 to 4. In certain embodiments, $R^x$ may be either singly or doubly bonded to the cycloalkyl ring to which it is attached.

Other useful initiators may include those of formula (32):

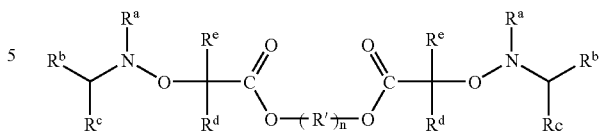

(32)

wherein $R^a$, $R^b$, $R^c$, $R^d$, and $R^e$ are as described in formula (29), above. Also in formula (30), R' is branched or unbranched, and is a $C_{1-30}$ alkylene, substituted $C_{1-30}$ alkylene, $C_{6-30}$ arylene, substituted $C_{6-30}$ arylene, $C_{1-30}$ alkyleneoxy, substituted $C_{1-30}$ alkyleneoxy, $C_{7-30}$ alkylene-arylene, substituted $C_{7-30}$ alkylene-arylene, $C_{7-30}$ arylene-alkylene, or substituted $C_{7-30}$ arylene-alkylene; and n is 1 to 100. Where a substituent is used, the substituent may be a halogen, phosphate group, sulfate group, sulfonate group, hydroxy group, and the like.

In formulas (29) and (30), specific examples of useful $R^a$ and $R^b$ groups include methyl, ethyl, isopropyl, t-butyl, and 3-methyl-1-hydroxy-3-butyl. Specific examples of useful $R^c$ groups include phenyl, 4-acetoxyphenyl, 4-halophenyl, dimethylphosphite, diethyl phosphite, dipropyl phosphite, diisopropyl phosphite, dibutyl phosphite, dihexylphosphite, dioctyl phosphite, and the like. Examples of useful $R^d$ and $R^e$ groups include H, methyl, ethyl, propyl, carboxymethyl, hydroxymethyl, and cyclic structures including cyclopentyl, cyclohexyl and the like.

In an embodiment, exemplary initiators for use in NMP processes may include monofunctional initiators having structures shown in formulas (33)-(35):

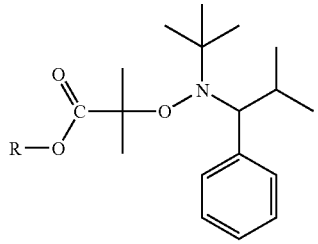

(33)

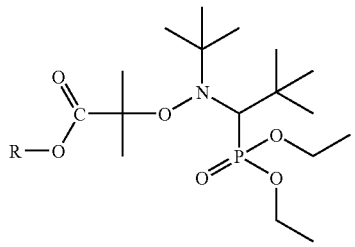

(34)

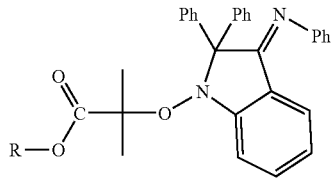

(35)

wherein R is H, methyl, ethyl, phenyl, 4-acetoxyphenyl, 4-methoxyphenyl, 4-methoxybenzyl, or benzyl. The group Ph, as used herein, represents an unsubstituted phenyl group. Examples of difunctional initiators that may be used include those having structures shown in formulas (36) and (37):

(36)

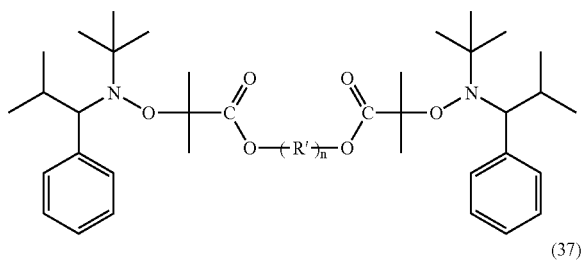

(37)

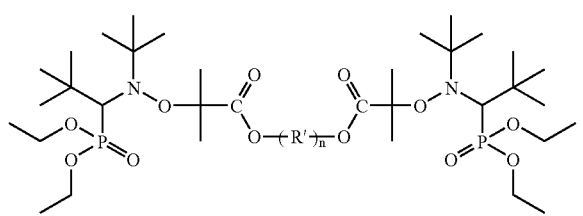

wherein R' can be 1,2-ethylene, 1,2-propylene, 1,3-propylene, 2-methyl-1,2-propylene, 2-methyl-1,3-propylene, 1,2-butylene, 1,4-butylene, meso-2,3-butylene, 2,3-dimethyl-2,3-butylene, 1,2-pentylene, 1,5-pentylene, 2,3-pentylene, 2,4-pentylene, 1,4-pentylene, 2-methyl-2,4-pentylene, 1,3-hexylene, 1,4-hexylene, 1,5-hexylene, 1,6-hexylene, 2,5-hexylene, 2,5-dimethyl-2,5-hexylene, 1,3-dimethylene cyclobutylene, 2,2,4,4-tetramethyl-1,3-dimethylene cyclobutylene, 1,2-cyclopentylene, 1,3-cyclopentylene, 1,3-dimethyl-1,3-cyclopentylene, 1,2-cyclohexylene, 1,3-cyclohexylene, 1,4-cyclohexylene, 1,4-dimethylene cyclohexylene, and the like; and n is 1 to 500. Where n is greater than 1, R' can include the diradicals of polyalkylene glycols, such as, polyethylene glycol diyl radical, polypropylene glycol diyl radical, block poly(ethylene glycol-co-propylene glycol) diyl radical, random poly(ethylene glycol-co-propylene glycol) diyl radical, and the like.

The initiators described in formulas (29) to (37) are useful for initiating the controlled radical polymerization of olefinically unsaturated monomers such as those described in formulas (17) to (19). Polymerization may be performed using neat monomer (i.e., with no added solvent) or in solution. Typically, where solvent is used, the monomer is present in solution at concentrations of 10 to 95 wt % of the total solution weight. Solvents may be present where a neat reaction is not practical, such as where the monomer used have high molecular weights, where the polymerized product has a high $T_g$ or high crystallinity, and/or the monomers are solids at the reaction temperatures. In the latter cases of products with high $T_g$ or solid monomers, sufficient solvent may be present to plasticize the resulting polymer and maintain a fluid melt. Polymerizations using NMP polymerization processes may typically be carried out at temperatures of 50 to 150° C., specifically 60 to 140° C., and more specifically 65 to 130° C., where the temperature of polymerization selected can depend upon the structure of the initiator used, the monomer selection, and the monomer concentration. Monomers that are useful for polymerization using NMP polymerization processes also include those described in formulas (17) and (19) above. Classes of useful monomers include, for example, acrylates, methacrylates, acrylamides, substituted acrylamides, styrenes, substituted styrenes, and block or random copolymers comprising at least one of the foregoing.

Monomers such as those described herein may be polymerized with the above described nitroxide initiators using an NMP polymerization process. Upon initiating polymerization in an NMP process, each initiator is capable of starting an individual polymer chain. It is believed that the kinetics of polymerization are such that each polymer chain is initiated at approximately the same time, and monomer is added to each polymer chain at approximately the same rate as the other polymer chains. In this way, polymerization using an NMP polymerization process provides polymers wherein each chain in a single polymer batch has approximately the same $M_w$, $M_n$, and composition. The polymers produced in this way thus can have low polydispersities ($M_w/M_n$) of less than or equal to 1.5, and consistent compositions. Polymer chain composition and structure may be controlled by several methods, such as varying the monomer feed (the make-up of the mixture of monomers) during polymerization, selecting monomers for their reactivity ratios (i.e., the reactivity of a monomer radical toward an unreacted monomer of the same or a different structure), choosing an initiator or initiation method that is selective for certain monomers, reaction temperature, reaction time, and concentration. The molecular weight of the polymer produced by NMP is controlled by the ratio of the monomer concentration to the initiator concentration and the conversion of the monomer. Similarly, the degree of polymerization is controlled by the ratio of the concentration of monomer to the concentration of initiator. In an embodiment, the degree of polymerization as represented by the average number of acrylate block units M in a polyacrylate polymer prepared using NMP is 5 to 1,000. In a specific embodiment, the degree of polymerization in a polymer prepared using NMP is 5 to 220.

Thus, in an embodiment, polymerization using an NMP polymerization process, and using initiators of general formulas (29) and (30), NMP polymerization can provide polymers with polydispersities of less than or equal to 1.5, specifically less than or equal to 1.3, more specifically less than or equal to 1.2, and still more specifically less than or equal to 1.1.

In an embodiment, initiators of formulas (31) to (37) can, when polymerized using NMP polymerization process using the monomers described herein, provide polymers having, for example, formulas (38) to (42) (respectively):

(38)

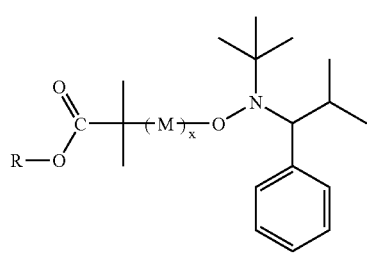

(39)

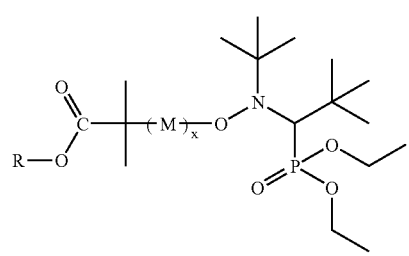

-continued

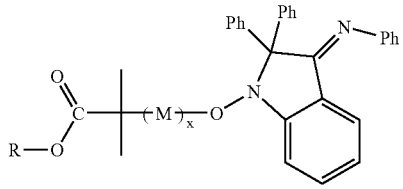
(40)

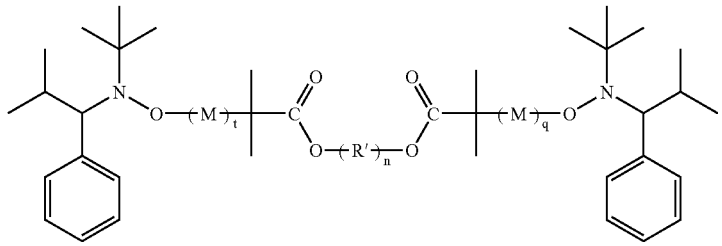
(41)

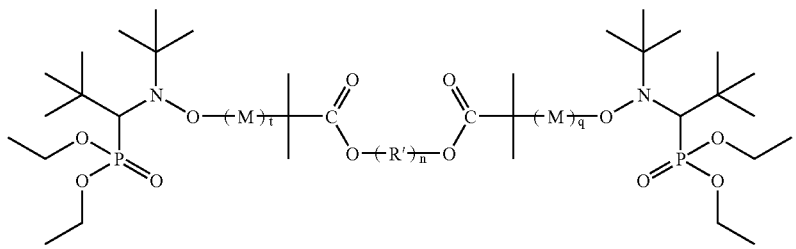
(42)

where M is an acrylate block unit derived from a monomer of formula (18) and/or (19), wherein at least one monomer is of formula (18). In formulas (38) and (39), x is 5 to 1,000, and R is as described for formulas (31) and (35). In formulas (41) and (42), t and q are each 1 to 999, with the proviso that the sum of t and q is 5 to 1,000. Also, in formulas (41) and (42), R' and n are as described for formulas (36) and (37) respectively.

The end group of a polyacrylate polymer, prepared using an NMP polymerization process, may be modified to provide a polymerizable end group for use in the further preparation of polyacrylate-polycarbonate copolymers having diblock, triblock and/or multiblock polymer structures. As the C—O bond linking the nitroxide to the end of the polymers can break at elevated temperatures, and therefore lead to thermally initiated depolymerization of the polymer chains, a process sometimes referred to as "unzipping", the polymers are processed to modify end group functionality at a temperature that is below the ceiling temperature at which unzipping of the polymer chain becomes significant, and in subsequent processing steps. Methods for replacing the nitroxide containing end group with different functional groups useful for copolymerization with polycarbonate and/or polyester precursors are available in the art, and typically involve heating the polymer in the presence of an excess of an end-group modifying agent, either in melt phase or solution, followed by isolation of the end-group modified polyacrylate polymer. In an embodiment, useful end-group transformations that can provide the desired end-group functionality include those provided by displacement of the nitroxide end-groups of the polymers of formulas (38) to (42) with a stable, terminal end-group modifier of formula (43):

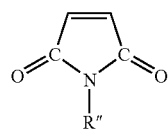
(43)

where R" is H, or is of the formula (44) to (47):

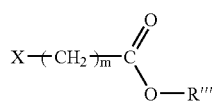
(44)

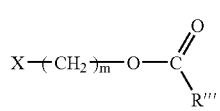
(45)

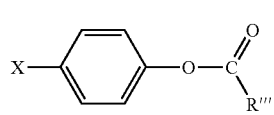
(46)

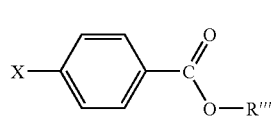
(47)

where X corresponds to formula (43), and R''' is branched or straight chain, substituted or unsubstituted $C_{1-30}$ alkyl, $C_{6-30}$ aryl, or $C_{7-30}$ aralkyl. Where a substituent is used, the substituent may be $C_{1-8}$ alkyl, $C_{1-20}$ aryl, $C_{1-8}$ alkoxy, $C_{1-20}$ acyl, nitro, or halogen. Also, in formulas (44) and (45), m is 1 to 500.

Also in an embodiment, polymer derived from either of formulas (38) or (39), and functionalized using end groups of formula (43) may have a structure of formula (48):

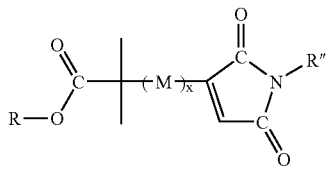
(48)

wherein R, M, and x are each as described for either of formulas (38) or (39), and wherein R″ is of any one of formulas (44) to (48). Where a polymer of formula (41) or (42) is functionalized with formula (43), the polymer may have the structure of formula (49):

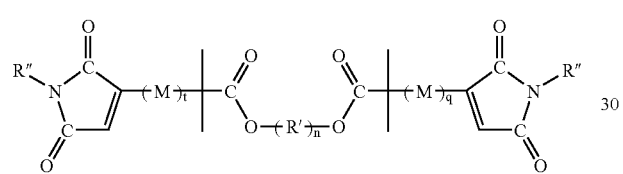
(49)

where M, R″, t, q, and n are as defined for either of formulas (38) or (39), and wherein R″ is as defined for formulas (44) to (48), above.

The ester functional groups of formulas (44) to (48) may be transformed to acid (formulas (44) and (47)) or hydroxy (formulas (45) and (46)) groups by functional group transformation, such as hydrolysis under acidic or basic conditions, or hydrogenolysis under reducing conditions. It is understood that the type of cleavable functional group present (branched alkyl ester, straight chain alkyl ester, aryl ester, benzyl ester, and the like) on the chain end, the method of deprotection (e.g., thermolysis, acid hydrolysis, base hydrolysis, hydrogenolysis, and the like), and the conditions used in the deprotection (polar or nonpolar solvents, absence of solvent, heat, and the like), are each selected for compatibility with the functionality present in the polyacrylate polymer, and where the conditions or combination of conditions used to effect end group transformation does not substantially adversely affect the desired properties of the polyacrylate polymer. In this way, polymers of formulas (48) and (49) may be transformed to suitably functionalized polymers having structures of, respectively, formulas (50) and (51):

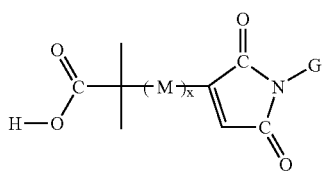
(50)

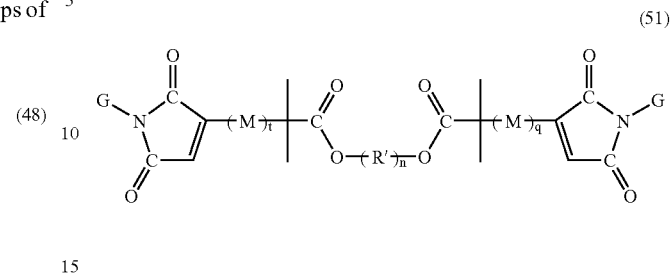
(51)

where M in each of formulas (50) and (51) is as described for formulas (48) and (49), respectively; x is 5 to 1,000 in formula (50); and in formula (51), t and q are each 1 to 999, with the proviso that the sum of t and q is 5 to 1,000. Also in formulas (50) and (51), G corresponds to the deprotected product of formulas (44) to (47) corresponding to the structures of formulas (52) to (55), respectively.

(52)

(53)

(54)

(55)

Thus, a polyacrylate polymer having a structure of formulas (50) or (51), produced by NMP polymerization and subject to chain end transformation and functionalization, is copolymerizable with an aromatic diol of formula (3) or (7) and a carbonyl source (e.g., phosgene) to make a block copolymer (diblock, triblock, multiblock) comprising a polycarbonate block and a polyacrylate block. The adjacent blocks are linked by aryl ester linking groups.

In an exemplary embodiment, polyacrylate polymers prepared by NMP polymerization and subject to end group transformation to provide polymerizable end groups have formulas (56) and (57):

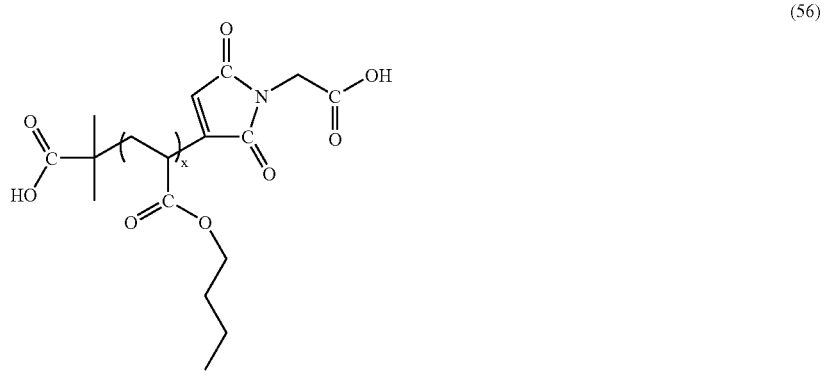

(56)

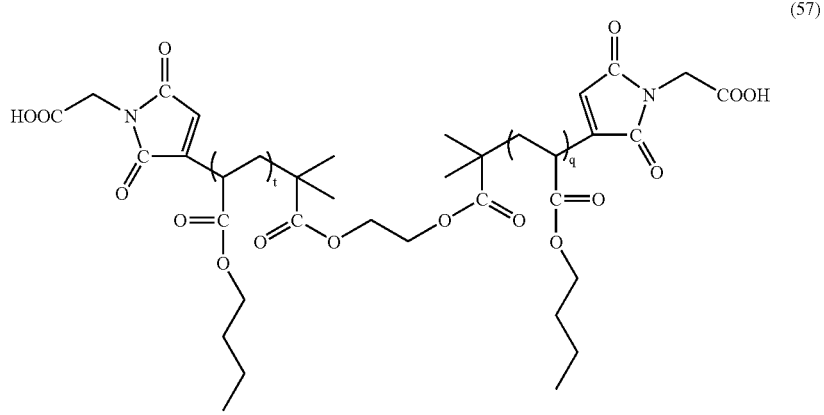

(57)

where x, is as defined for formula (50), and t, and q are as defined for formula (51).

In another exemplary embodiment, a polymer derived from formula (51), produced by NMP polymerization and followed by chain end functionalization and deprotection, has the formula (58):

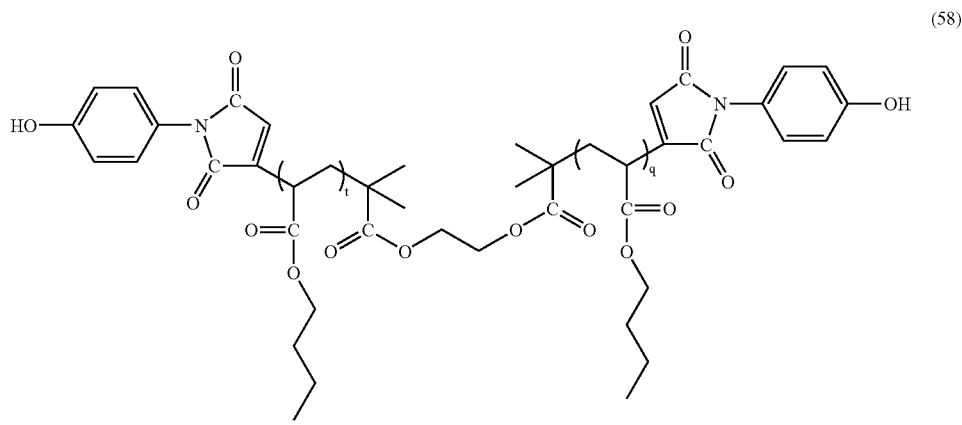

(58)

where t and q are as defined for formula (51), above. A polymer having phenolic end groups is capable of copolymerizing with an aromatic diol compound and carbonyl source such as, for example, bisphenol A and phosgene respectively, to make a copolycarbonate comprising a polyacrylate block and a polycarbonate block. In other embodiment, the polymer may be a diblock copolymer, triblock copolymer, tetra block copolymer, or the like.

Polyacrylate polymers may also be prepared using metal-mediated controlled free radical polymerization methods. An exemplary method is atom transfer radical polymerization (ATRP), in which a living free radical is thermally reversibly bound to a metal ligand complex with an unpaired electron via a metal to carbon single bond (M-C). Upon heating of the complex, the metal-carbon bond reversibly breaks, forming an active radical species that can add a reactive, olefinically unsaturated monomer. ATRP has an advantage over NMP in that a greater variety of monomers may be incorporated in the polymer chain than may be included using NMP. Specifically, (meth)acrylates, styrenes, (meth)acrylonitrile, and (meth) acrylamides are polymerizable using ATRP polymerization processes.

ATRP monomers are initiated by treating an initiator compound having a carbon-halide with a metal complex, wherein the metal in the complex is in an oxidation state with an unbound electron. Exemplary metals for use in metal complexes include $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{3+}$, $Mn^{4+}$, $Rh^{3+}$, $Rh^{4+}$, $Re^{2+}$, $Re^{3+}$, $Co^+$, $Co^{2+}$, $V^{2+}$, $V^{3+}$, $Zn^+$, $Zn^{2+}$, $Au^+$, $Au^{2+}$, $Ag^+$, $Ag^{2+}$ or a combination comprising at least one of the foregoing metals. The complexes also comprise coordinating or non-coordinating anions including halides (fluoride, chloride, bromide, iodide), carboxylates, carbonates, sulfates, sulfonates, phosphates, phosphonates, sulfides, thiocyanates, and the like, or a combination comprising at least one of the foregoing anions. Exemplary anions include $Cl^-$, $Br^-$, $F^-$, $I^-$, $NO_3^-$, $PF_6^-$, $BF_4^-$, $SO_4^{2-}$, $CN^-$, $^-SPh$, $SCN^-$, $^-SePh$, or triflate ($CF_3SO_3^-$). Copper (I) triflate, or its benzene complex $(CF_3SO_3Cu)_2C_6H_6$, are useful. An example of a specifically useful metal compound is copper (I) bromide (CuBr).

In addition, the metal complex may further include coordinating, non-ionic ligands. Such non-ionic ligands may be monomeric, dimeric, oligomeric, or polymeric; cyclic or acyclic; and may comprise heteroatom-containing functional groups based on oxygen, nitrogen, sulfur, or phosphorous having free electron lone pairs available for coordinating to the metal, including nitriles, ethers, amines, imines, amines, sulfides, disulfides, phosphines, or polymers or oligomers comprising at least one of the foregoing heteroatom-containing functional groups. The heteroatom-containing functional groups may comprise $C_{1-30}$ alkyl groups, $C_{6-30}$ aryl groups, $C_{7-30}$ arylalkyl groups, or a combination comprising at least one of the foregoing. Coordinating ligands may be monodentate or multidentate. An example of a monodentate coordinating ligand is acetonitrile ($CH_3CN$). The coordinating ligand is desirably a multidentate ligand, having at least two coordinating atoms present. Of these, nitrogen compounds are useful. Examples of typical useful coordinating bidentate ligands include 2,2'-bipyridyls; phenanthrolines; and $C_{1-20}$ alkyl or $C_{6-30}$ arylalkyl substituted versions of these. Other Exemplary nitrogen-containing bidentate ligands may include, for example, diimines having a 1,4-diaza-1,3-butadiene structure, as shown in formula (59) below; bis-1,1'-oxazoles, as shown in formula (60) below; 2-pyridinecarbaldehyde imines, as shown in formula (61), below; or quinolines as shown in formula (62) below:

(59)

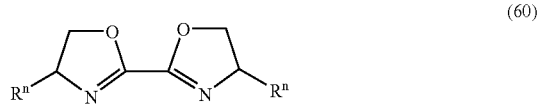

(60)

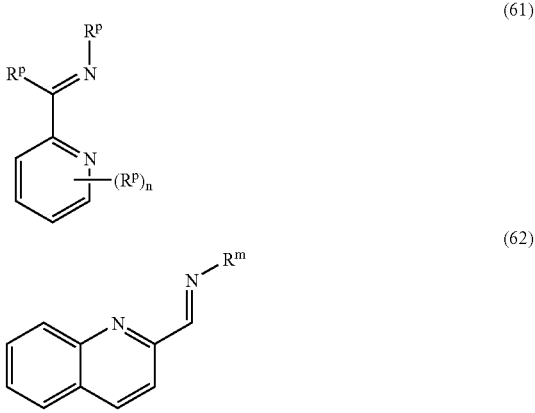

wherein $R^m$, $R^n$, $R^o$, and $R^p$ in formulas (59)-(62) are each individually H, or branched or straight chain carbon-containing groups comprising $C_1$-$C_{30}$ alkyl, $C_3$-$C_{30}$ cycloalkyl, $C_6$-$C_{30}$ aryl, or $C_7$-$C_{30}$ aryl-alkyl.

Initiator compounds useful for promoting ATRP polymerization reactions generally comprise halogenated $C_2$-$C_{30}$ alkyl compounds or halogenated $C_7$-$C_{30}$ alkyl-aryl compounds. Desirably, the halogen is attached to an aliphatic carbon, and may be located at a primary, secondary, or tertiary carbon center. Typically, the halogen is located at a primary or secondary carbon center located alpha to an activating substituent, such as an aryl group, carboxylate group, nitrile group, keto group, aldehyde group, or other such activating group. Exemplary primary or secondary halogen-containing compounds include alpha-haloesters and benzyl halides. Further, the initiator compound is substituted with a functionalizable group such as, for example, a carboxylic acid, a carboxylic acid derivative such as an ester, amide, hydroxamic acid, and the like; a hydroxy group including an alcohol or phenolic hydroxy group; an aliphatic or aromatic amine group; a mercaptan; or other functional group that is compatible with the conditions present in the ATRP polymerization. Initiator compounds may be monomeric, or may be dimers, trimers, tetramers, pentamers, oligomers, or polymers comprising more than one initiator compound.

An exemplary initiator compound is shown in formula (63):

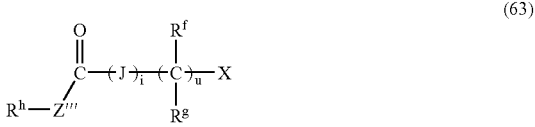

wherein X is a halogen (fluorine, chlorine, bromine, iodine), J is a spacer group comprising a branched or straight chain, substituted or unsubstituted $C_1$-$C_{30}$ alkylene group, $C_1$-$C_{30}$ heteroalkylene group, $C_7$-$C_{30}$ arylene-alkylene group, $C_7$-$C_{30}$ arylene-heteroalkylene group, $C_7$-$C_{30}$ alkylene-arylene group, or $C_7$-$C_{30}$ heteroalkylene-arylene group. Where J comprises heteroalkylene substructures comprising structural heteroatoms, the heteroatoms may include oxygen, sulfur, nitrogen, phosphorous, and silicon. A substituent, where used, can include, for example, nitro, cyano, hydroxy, carbonyl, carboxylate, carboxylamide, halogen (fluoro, chloro, bromo, iodo), $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy.

Also in formula (63), Z''' is a heteroatom linking group comprising oxygen or substituted or unsubstituted nitrogen, wherein the substituent on the nitrogen comprises H, —OH, carbonyl, carboxylate, carboxyamide, $C_1$-$C_{12}$ alkyl, $C_1$-$C_{12}$ alkyl ether, $C_1$-$C_{12}$ acyl, $C_1$-$C_{12}$ acyloxy, $C_6$-$C_{20}$ aryl, or $C_6$-$C_{20}$ aryloxy. Also in formula (59), $R^f$, $R^g$, and $R^h$ are each independently H, or branched or straight chain carbon-containing groups comprising $C_1$-$C_{30}$ alkyl, $C_3$-$C_{30}$ cycloalkyl, $C_6$-$C_{30}$ aryl, or $C_7$-$C_{30}$ aryl-alkyl. Also in formula (59), i is 0 or 1, and u is 0 to 500, with the proviso that the sum of i and u is greater than or equal to one.

In another embodiment, an initiator may also have formula (64):

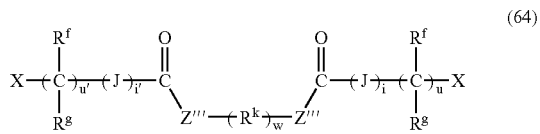

(64)

wherein X, $R^f$, $R^g$, and Z''' are as described above; i, i', are each independently 0 or 1, and v and v' are each independently 0 to 500, with the proviso that the sums of i and u and of i' and u' are greater than or equal to one.

In a specific embodiment, an exemplary initiator compound is shown in formula (65):

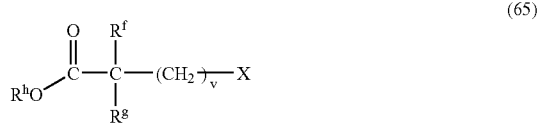

(65)

where $R^f$ and $R^g$ and $R^h$, are each as described in formula (63), X is halogen, and v is 0 to 500. In a specific embodiment, in formula (65) X is chloro, bromo, or iodo; $R^f$ and $R^g$ are each independently H, methyl, or ethyl; v is 1 to 3; and $R^h$ comprises a labile group, where the labile group may be removed using deprotection chemistry such as, for example, chemistries using thermolysis, acid deprotection, base deprotection, or hydrogenolysis. In an exemplary embodiment, Rh is itself the labile group, examples of which include acid-sensitive and/or thermally sensitive groups such as t-butyl, 2-tetrahydropyranyl, ethyl vinyl ether, propyl vinyl ether, cyclohexyl vinyl ether, cyclohexyl-1,4 divinyl ether, and the like; base sensitive groups such as 4-nitrobenzyl, 2-nitrobenzyl; groups which may be removed by hydrogenolysis such as benzyl; or groups which may be removed using other methods such as trimethylsilyl which is removable by the presence of fluoride. In another embodiment, $R^h$ may be a group which terminates in a labile group such as one of those above. Such groups may include, for example, monotetrahydropyranyl bisphenol-A, or bisphenol-A mono-(t-butyloxycarbonate).

Where the labile group is attached to a carbonyl through a heteroatom, upon deprotection, a carboxylic acid hydroxy group is exposed. Where the labile group is attached to an intermediary group, the functionality to which the labile group is attached is exposed. Such exposed functional groups may include alcohol hydroxys, phenolic groups, or carboxylic acids. Initiators having carboxylic acid functionality may be either protected α-halocarboxylic acids or carboxylic acid initiators with remote halogens, wherein remote halogens are separated from the free (or labile group-blocked) carboxylic acid group by a chain comprising greater than three connective atoms. In an exemplary embodiment, α-halocarboxylic acids that are useful as initiators, or which may be derivatized to make initiators, include those of formulas (66)-(69).

(66)

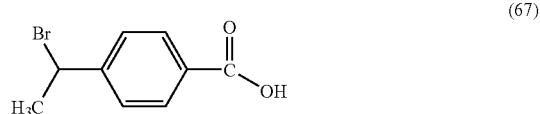

(67)

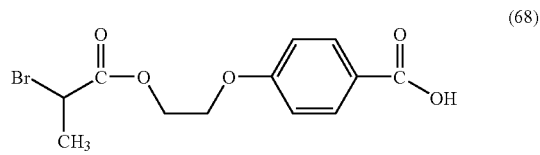

(68)

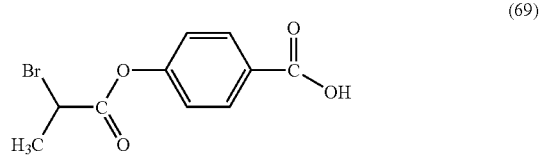

(69)

The free carboxylic acids of initiators may form γ-butyrolactones under the reaction conditions, and thus derivatives of the carboxylic acid are commonly used. However, in some embodiments, unprotected α-halocarboxylic acids initiators can be used in lieu of a carboxylate derivative, with slightly less polymerization efficiency.

In addition to protected (i.e., deprotectable) and/or unprotected α-halocarboxylic acids, hydroxy- or amino-functionalized α-halocarboxylic esters may also be used, such as, for example, those shown in formulas (70) and (71), below.

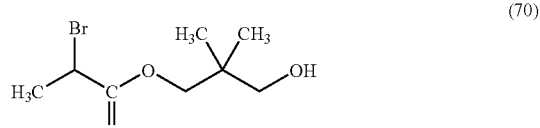

(70)

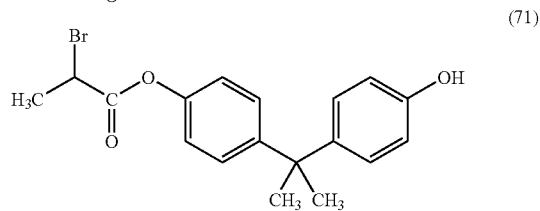

(71)

The initiator compounds are used in combination with the metal salt and chelating compound to effect polymerization of an acrylate monomer. Polymerizations using ATRP polymerization processes may typically be carried out at temperatures of 50 to 150° C., specifically 60 to 140° C., and more specifically 65 to 130° C., where the temperature of polymerization selected can depend upon the structure of the initiator used, the monomer selection, and the monomer concentration. A useful amount of catalyst is 0.01 to 100 millimoles (mmol) per mole of monomer, specifically 1 to 10 mmol per mole of monomer, where the stoichiometries of the initiator to metal salt to the chelating compound of 1:0.2:5 to 1:5:0.2. Where a solvent is used, the concentration of monomer in the solvent is 5 to 99 percent by weight of the total weight of the monomer and solvent. Alternatively, the reaction may be carried out in neat monomer at a temperature sufficient to provide complete conversion (i.e., greater than 95 mol % of the initial monomer charge). Polymerization may be performed using neat monomer (i.e., with no added solvent) or in solution. Typically, where solvent is used, the monomer is present in solution at concentrations of 10 to 95 wt % of the total solution weight. Solvents may be present where a neat reaction is not practical, such as where the monomer used have high molecular weights, where the polymerized product has a high $T_g$ or high crystallinity, and/or the monomers are solids at the reaction temperatures. In the latter cases of products with high $T_g$ or solid monomers, sufficient solvent may be present to plasticize the resulting polymer and maintain a fluid melt. Monomers that are useful for polymerization using NMP polymerization processes include those described in formulas (17) and (18) above. Classes of useful monomers and macromers (i.e., functionalized oligomers with olefinically unsaturated groups that may be copolymerized with olefinically unsaturated monomers) include, for example, acrylates, methacrylates, styrenes, acrylamides, methacrylamides, acrylonitrile, and methacrylonitrile.

In an embodiment, polymerization of an initiator compound of formula (63) with a suitable methacrylate monomer affords a polyacrylate of formula (72):

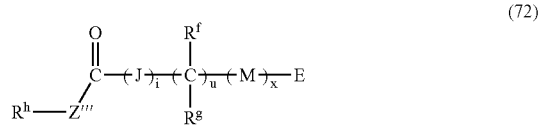

(72)

wherein $R^f$, $R^g$, $R^h$, $Z'''$, J, i, and u are each as defined for formula (63). Also in formula (67), M represents an acrylate block unit as described in formula (9) above, and x is 5 to 1,000. In addition, E represents a terminal group. In an embodiment, E is a nonmetallic, functionalizable end group comprising an alcohol, carboxylic acid, carboxylate ester, phenol, or a macromer of formula (i.e., telechelic oligomer) chain. The macromers described herein are polyacrylate polymer chain prepared by ATRP, and functionalizable on each end.

In an embodiment, polymerization of an initiator compound of formula (64) with a suitable methacrylate monomer affords a polyacrylate of formula (73):

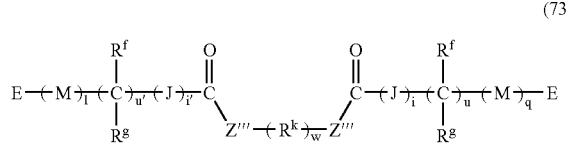

(73)

wherein $R^f$, $R^g$, $R^k$, $Z'''$, J, i, i', u, and u', and w are each as defined for formula (64). Also in formula (72), M represents an acrylate block unit as described in formula (9) above, and l and q are each individually 1 to 999, with the proviso the sum of l and q is 5 to 1,000. In addition, E is as described for formula (72), above.

Monomers such as those described herein may be polymerized with the above described nitroxide initiators using an ATRP polymerization process. Upon initiating polymerization, and as for NMP polymerization described above, each initiator is capable of starting an individual polymer chain. It is believed that the kinetics of polymerization are such that each polymer chain is initiated at approximately the same time, and monomer is added to each polymer chain at approximately the same rate as the other polymer chains. In this way, polymerization using an ATRP polymerization process provides polymers wherein each chain in a single polymer batch has approximately the same $M_w$, $M_n$, and composition. The polymers produced in this way thus can have low polydispersities ($M_w/M_n$) of 1 to 1.5 and consistent compositions. Polymer chain composition and structure may be controlled by several methods, such as varying the monomer feed (the make-up of the mixture of monomers) during polymerization, selecting monomers for their reactivity ratios (i.e., the reactivity of a monomer radical toward an unreacted monomer of the same or a different structure), choosing an initiator, metal catalyst, ligand, or initiation method that is selective for certain monomers, reaction temperature, reaction time, and concentration. The molecular weight of the polymer produced by ATRP is controlled by the ratio of the monomer concentration to the initiator concentration and the conversion of the monomer. In an embodiment, the degree of polymerization as represented by the average number of acrylate block units M in a polyacrylate polymer prepared using ATRP is 5 to 1,000. In a specific embodiment, the number of acrylate block units M in a polymer prepared using ATRP is 5 to 220.

Polymerization using an ATRP polymerization process, and using initiators of general formulas (63) and (64), can thus desirably provide polymers with polydispersities of less than or equal to 1.5, specifically less than or equal to 1.3, more specifically less than or equal to 1.2, and still more specifically less than or equal to 1.1.

Following the conversion of monomer by ATRP polymerization, the halide is covalently bound to the macromer as an end group. Removal of the halide and conversion to a functionally useful end group as described above may be effected using a variety of different reactions for conversion of carbon-halogen (C—X) to carbon-carbon (C—C), carbon-oxygen (C—O), carbon-nitrogen (C—N), carbon-sulfur (C—S), or other intermediate non-metallic linkages for appending a functionally useful end group to the macromer chain end. Examples of useful X—C to C—O end group transformations wherein useful end group compounds (left side of reaction) are converted to their corresponding macromer adducts (right side of reaction), are as shown below:

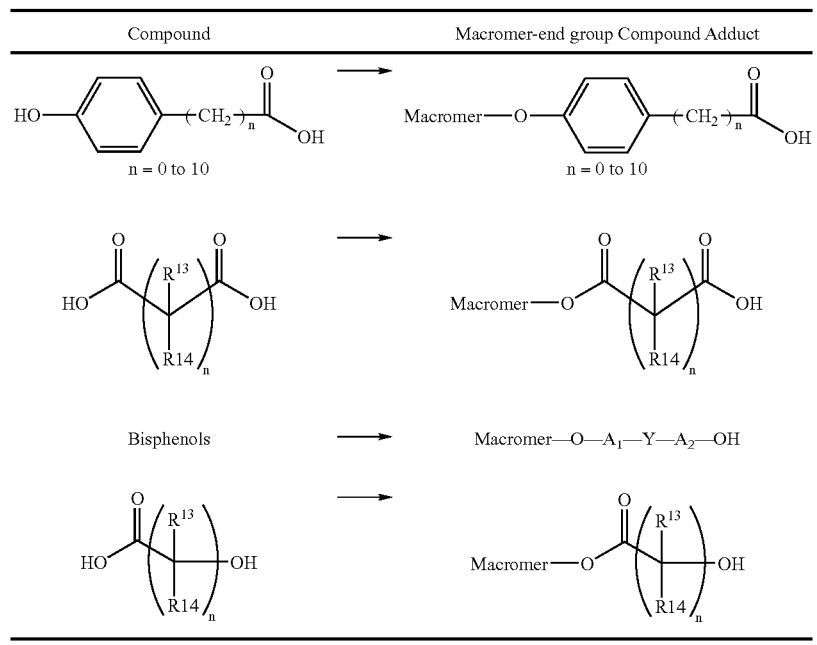

wherein $R^{13}$ and $R^{14}$ are each independently H, or branched or straight chain carbon-containing groups comprising $C_1$-$C_{30}$ alkyl, $C_3$-$C_{30}$ cycloalkyl, $C_6$-$C_{30}$ aryl, or $C_7$-$C_{30}$ arylalkyl; n is 0 to 10; and $A^1$, $A^2$, and Y are each as described in formula (3).

In another embodiment, macromers having intermediate halide end groups can be coupled head-to-head in the presence of a reducing agent, such as nanosize copper, zerovalent iron, tin octanoate (SnOct$_2$), or ascorbic acid. Examples are shown below of dimeric macromer structures (right side of reaction arrow) formed by coupling of individual macromers (left side of reaction arrow):

wherein R, $R^1$, $R^2$, and $R^{12}$ are each individually an H, $C_1$ to $C_{30}$ alkyl, $C_6$ to $C_{30}$ aryl, or $C_7$ to $C_{30}$ aryl alkyl; In represents an initiator group derived from an initiator compound; each m is individually 0 to 999, and each n is individually 1 to 999, with the proviso that the sum of all m and n for each non-dimeric macromer is 5 to 1,000; and the sum of all m and n for each dimeric macromer is 5 to 1,000.

In an exemplary embodiment, a useful phenolic end-capped macromer prepared using ATRP polymerization has the structure shown in formula (74), below:

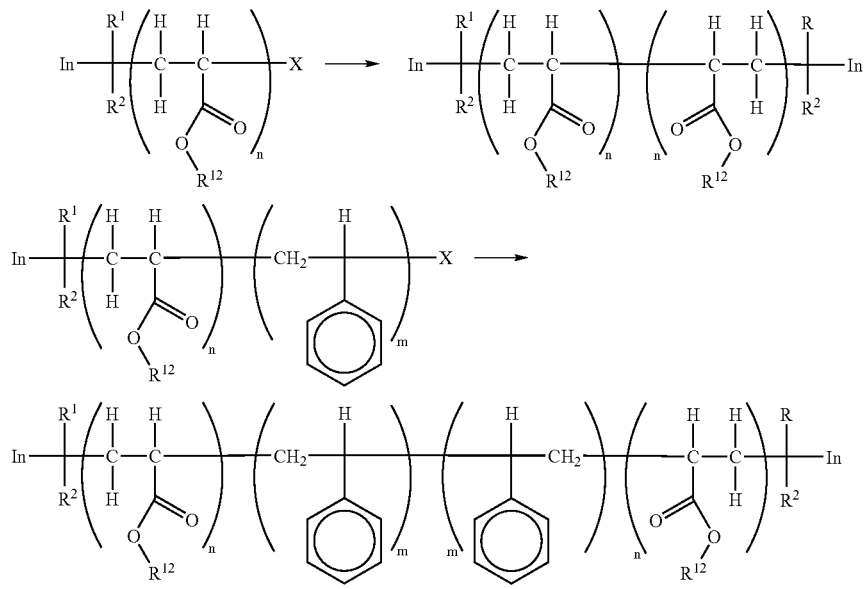

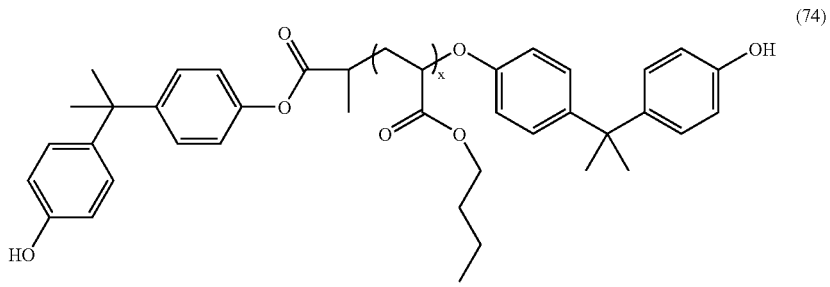

(74)

wherein x is 5 to 1,000. A polymer having phenolic end groups is capable of copolymerizing with an aromatic diol compound and carbonyl source such as, for example, bisphenol A and phosgene respectively, to make a copolycarbonate comprising a polyacrylate block and a polycarbonate block.

In another exemplary embodiment, a useful carboxylic acid end-capped macromer prepared using ATRP polymerization has the structure shown in formula (75), below:

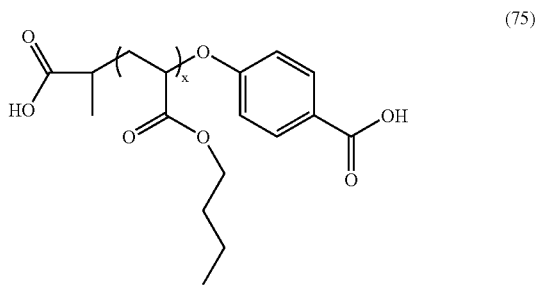

(75)

wherein x is 5 to 1,000. A polymer having carboxylic acid end groups is capable of copolymerizing with an aromatic diol compound and carbonyl source such as, for example, bisphenol A and phosgene respectively, to make a copolycarbonate comprising a polyacrylate block and a polycarbonate block. In other embodiment, the polymer may be a diblock copolymer, triblock copolymer, tetrablock copolymer, or the like.

Of the above-described CFRP polymerization methods (RAFT, ATRP, and NMP), polyacrylates prepared using NMP polymerization process are of use in high purity, low odor, and low color applications. The presence of metals may affect the color capability, color stability, thermal stability, and/or other polymer properties affected by the presence of such metals. Polymers prepared using NMP are useful where it is desirable to obtain a polymer having a low level of metals such as for example, copper, which is introduced to the polyacrylate polymer as a catalytic reactant in the ATRP polymerization method, and which may require post process purification to reduce the copper content. ATRP polymers may be useful where a greater variety of acrylate block units is desired, wherein ATRP as a method generally allows polymerization of a greater variety of monomers. In addition, polyacrylate polymers prepared using NMP are also of use where it is desirable that the polyacrylate is free of organic sulfide groups including, for example, organic sulfide linking and/or chain-terminating groups, and their precursor organosulfur compounds. Inclusion of organosulfur compounds in the reaction may cause such compounds to be retained in the copolymers prepared using such compounds, which may in turn produce undesirable odors upon melt processing of the polymer. In addition, use of organosulfur compounds can impart a slight color to a polyacrylate prepared using the sulfur compound, which may be undesirable from the perspective of color capability of polyacrylate-polycarbonates prepared using the polyacrylate polymers, and in particular where the polyacrylate-polycarbonate is for use in preparing articles having lighter colors such as white or yellow. Polymers prepared using RAFT and other polymerization methods which employ sulfur compound-based chain-transfer initiators and/or chain transfer agents thus may be useful for applications other than those requiring a low odor and/or high color capability, such as those applications also requiring the polymerization of monomers that may not be reactive under the conditions of NMP polymerization. Thus, in an embodiment, the polyacrylate-polycarbonate comprises difunctional end group functionalized telechelic oligomer prepared using reversible addition-fragmentation chain transfer polymerization, nitroxide-mediated polymerization, or atom transfer radical polymerization. In a specific embodiment, the polyacrylate-polycarbonate comprises a difunctional end group functionalized telechelic oligomer prepared using nitroxide-mediated polymerization.

The difunctional polyacrylate polymer having suitably functionalized end groups is condensed with a dihydroxy aromatic compound, a carbonyl source to provide the polyacrylate-polycarbonate. The condensation reaction can be carried out in a biphasic reaction using an organic solvent and water, in the presence of a base, otherwise referred to herein as an interfacial reaction. In yet another method, the reactants may be condensed using a melt polymerization method.

In an embodiment, an exemplary method for forming a polyacrylate-polycarbonate copolymer comprises combining the end group functionalized polyacrylate polymer, a dihydroxy aromatic compound, a base, solvent, and carbonyl compound in a medium. Exemplary bases include, for example, triethylamine, sodium hydroxide, sodium carbonate, sodium bicarbonate, sodium acetate, sodium gluconate, sodium citrate, sodium tartrate, and the like, or a combination comprising at least one of the foregoing. The medium can be maintained at a suitable pH while combining and reacting, and is biphasic, having a solvent phase and an aqueous phase. In an embodiment, the pH is of 8.5 to 11.5. The pH may be adjusted by addition of a base, for example sodium hydroxide as a concentrated solution in water, as needed during the reaction. In an embodiment, the carbonyl compound is phosgene. In other embodiment, the method of preparing the polyacrylate-polycarbonate copolymers herein, a chain stopper is included.

In another embodiment, the dihydroxy aromatic compound or the end group functionalized polyacrylate polymer may be pre-reacted with the carbonyl compound, prior to condensing to form the polyacrylate-polycarbonate. In an embodiment, pre-reacting may be done using phosgene to form a mono- or bis haloformate of the polyacrylate polymer. Pre-reacting may be done with isolating of the pre-reacted intermediate, or in situ wherein pre-reacting is done prior to addition of other components and prior to starting the polymerization itself.

In another embodiment, a phase transfer catalyst having the formula $(R^3)_4Q^-X$, wherein $R^3$, Q, and X are as defined above, may be included. In another embodiment, a polyester block is formed prior to the polycarbonate condensation, by reacting a dihydroxy aromatic compound and an dicarboxylic acid derivative in biphasic medium in the presence of a base to form a polyester block. The resulting polyacrylate-polyester-polycarbonate copolymer may be isolated by precipitation from the medium by addition to a non-solvent. In an embodiment, the dicarboxylic acid derivative comprises an aromatic dicarboxylic acid dihalide, an aliphatic dicarboxylic acid dihalide, an aliphatic-aromatic dicarboxylic acid dihalide, or a combination comprising at least one of the foregoing dicarboxylic acid dihalides. In an exemplary embodiment, the dicarboxylic acid dihalides include isophthalic acid dichloride, terephthalic acid dichloride, 1,4-cyclohexane dicarboxylic acid dichloride, or a combination comprising at least one of the foregoing. In a specific embodiment, the polyester block comprises the reaction product of reactive derivatives of isophthalic acid and/or terephthalic acid, with a resorcinol and/or bisphenol A.

It will be understood that all traditional ways of making polycarbonate and polyestercarbonates in solution are useful with the polyacrylate polymers. Alternatively, in another embodiment, polyacrylates having phenolic OH end groups (wherein one or both of X and X' are individually phenolic OH end groups) may be reacted with a carbonyl source to substantially form the bis-haloformate of the polyacrylates. For example, one method of substantially forming the bis-haloformate of a dihydroxy aromatic compound (such as a phenolic OH end capped polyacrylate) is described in U.S. Pat. No. 6,728,364 to Silva et al, incorporated herein by reference. This method involves passing the dihydroxy aromatic compound and a carbonyl halide, specifically phosgene, and a catalyst such as sodium hydroxide in aqueous solution, simultaneously through a heated tube reactor to form the bis haloformate of the dihydroxy aromatic compound in a continuous process. An advantage to this process is that the bis haloformates are formed in high yield, minimizing the formation of mono-haloformate intermediates which may lead to undesirable single carbonate linkages between polyacrylate units and carbonate units. In an embodiment, a polyacrylate polymer has aryl carbonate or substituted aryl carbonate end groups. In a specific embodiment, the polyacrylate polymer has phenyl carbonate or substituted phenyl carbonate end groups.

The polyacrylate-polycarbonate may alternatively be prepared by melt polymerization. The condensation reaction comprises combining the functional end-capped polyacrylate polymer, dihydroxy aromatic compound, a diaryl carbonate, and where desired, a catalyst. Solvent may optionally be present in quantities sufficient to provide a free-flowing melt. The condensation may be carried out at a temperature of 200 to 350° C., and may be carried out in a tube reactor, melt reactor, or other suitable reactor. The temperature is maintained for a time suitable to achieve the desired degree of condensation, and the desired properties for the polyacrylate-polycarbonate. An exemplary reaction time may be 100 to 300 minutes at the desired condensation temperature. Volatile components may be removed under reduced pressure of less than or equal to 150 millibars (mbar). Removal of volatile components under reduced pressure may be done during the condensation, after the condensation, or both during and after the condensation. In another embodiment, a polyester polymer or oligomer having hydroxy and/or carboxylate end groups is included in the melt polymerization.

In an embodiment, the diaryl carbonate included in the melt reaction is diphenyl carbonate, bis (4-methylphenyl) carbonate, bis-(4-chlorophenyl)carbonate, bis(4-acetylphenyl)carbonate, bis(4-methoxyphenyl)carbonate, bis(methylsalicyl) carbonate (BMSC), or a combination comprising at least one of the foregoing diaryl carbonates. A catalyst may be included in the melt polymerization. Useful catalysts are generally basic catalysts. Exemplary bases include metal hydroxides, metal carbonates and bicarbonates, metal carboxylates, metal alkoxides, metal phenoxides, tetraalkylammonium hydroxides, tetraalkyl ammonium carboxylates, tetraalkylammonium phenoxides, tetraalkylphosphonium hydroxides, tetraalkylphosphonium phenoxides, tetraalkylphosphonium carboxylates, alkylamines, arylamines, or a combination comprising at least one of the foregoing bases. Exemplary bases include, triethylamine, sodium hydroxide, potassium hydroxide, tetrabutylammonium hydroxide, tetrabutylphosphonium hydroxide, sodium carbonate, sodium bicarbonate, sodium acetate, sodium gluconate, sodium citrate, sodium tartrate, and the like, or a combination comprising at least one of the foregoing. Where used, the catalyst may be present in an amount of 1 to 1,000 ppm, specifically 2 to 500 ppm, and more specifically 5 to 300 ppm, based on the total weight of the reaction composition.

Proportions, types, and amounts of the reaction ingredients may be determined and selected by one skilled in the art to provide polyacrylate-polycarbonate copolymers having desirable physical properties including but not limited to, for example, molecular weight, polydispersity, glass transition temperature, impact properties, and haze. In an example of a specific embodiment, the dihydroxy aromatic compound used is bisphenol-A. In another example of a specific embodiment, an exemplary polyacrylate polymer is a functional end-capped telechelic oligomer comprising a poly(n-butylacrylate) homopolymer or copolymer. In an embodiment, a polyacrylate-polycarbonate copolymer prepared by the above method has, in addition to the $T_g$ for the polyacrylate block of less than −20 to −80° C., a $T_g$ for the polycarbonate block that is comparable to the typical glass transition temperature of 120 to 190° C. found in a polycarbonate or polyester-polycarbonate.

The polyacrylate-polycarbonate copolymer comprises acrylate block units in an amount of 1 to 30 weight percent, based on the total weight of the polyacrylate-polycarbonate copolymer. In an embodiment, the polyacrylate-polycarbonate comprises acrylate block units in an amount of 1 to 20 weight percent, more specifically 2 to 15 weight percent, and still more specifically 2 to 10 weight percent, based on the total weight of the polyacrylate-polycarbonate copolymer, with the proviso that the acrylate block units are provided by the polyacrylate block(s). In another embodiment, the polycarbonate block of the polyacrylate-polycarbonate may also comprise polyester blocks, wherein the polyester units may be used to displace an equal weight percentage of polycarbonate units. In an embodiment, where polyester and polycarbonate blocks are both used in the polyacrylate-polycarbonate polymer, the weight ratio of polyester block to polycarbonate block is 95:5 to 5:95, specifically 90:10 to 10:90, more specifically 85:15 to 15:85, and still more specifically 80:20 to 20:80, based on the combined weight of polycarbonate block and polyester block.

As disclosed herein, the polyacrylate-polycarbonate copolymer has an $M_n$ of 1,000 to 100,000, specifically 2,000 to 75,000, more specifically 5,000 to 50,000, and still more specifically 7,500 to 25,000, as determined by GPC using a crosslinked styrene-divinylbenzene column calibrated using polystyrene or polycarbonate standards, and a sample concentration of 1 milligram per milliliter (mg/ml). The polyacrylate-polycarbonate copolymer may also have an $M_w$ of 2,000 to 200,000 g/mol, specifically 4,000 to 150,000 g/mol, more specifically 10,000 to 100,000 g/mol, and still more specifically 15,000 to 50,000 g/mol, as determined by GPC using a crosslinked styrene-divinylbenzene column calibrated using polystyrene or polycarbonate standards, and a sample concentration of 1 mg/ml. The polyacrylate-polycarbonate copolymer may have a polydispersity ($M_w/M_n$) of less than or equal to 4, specifically less than or equal to 3.5.

Blocks of a compositionally distinct composition in a copolymer, such as for example polyacrylate blocks and polycarbonate blocks may form a discrete phase in which the block phase-separates from the surrounding polycarbonate matrix. This is observable particularly wherein the block has a large size (greater than an $M_w$ of appx. 5,000 g/mol. The blocks may thus form phase-separated regions (sometimes referred to herein as "domains"). A domain may be defined as a region within a surrounding matrix, having a discrete and observable boundary separating it from the surrounding matrix. The presence of specific domains of immiscible, phase-separated regions may be observed by appropriate analytical methods such as transmission electron microscopy (TEM). These phase-separated regions can vary greatly in size, but may typically have a long dimension of 20 to 200 nanometers or longer in contiguous length, with the length coincident with the direction of flow of the thermoplastic composition during extrusion or injection molding. It is believed that the presence of these phase-separated regions in the copolymer can scatter incident light. Increasing the size of the phase-separated regions, increasing the numbers of phase-separated regions, and increasing the intra-chain concentration of the blocks (also referred to herein as increasing the "blockiness") are each individually believed to correlate to increased scatter of incident light. The bulk properties of domain formation may therefore be observed using haze and/or light transmission measurements. Thus, absent a mechanism to prevent, reduce, mitigate, or eliminate the formation of these phase-separated regions, such domains may be observed to form where combinations of dissimilar, immiscible polymer blocks are used.

Exemplary mechanisms for controlling the formation of domains include limiting block size, limiting the concentration of blocks in the copolymer, and increasing the randomness and homogeneity of the blocks distributed in the polycarbonate. Thus, smaller phase-separated regions and decreased numbers of phase-separated regions may decrease the amount of scattered incident light, and thereby decrease the measurable haze of the combination, and where desired, provide an increase in the light transmission. It is desirable, in some embodiments, to have a block size for the polyacrylate block of the polyacrylate-polycarbonate copolymers that is large enough to provide the desired impact properties, but of small enough size to ensure that the blocks do not form domains of a size that can cause observable light scattering (i.e., haze). In some embodiments, the blocks are present in sufficient concentration in the polyacrylate-polycarbonate copolymer to provide the above desired impact properties while maintaining the low haze. Further, it is generally desirable that the blocks are distributed sufficiently randomly and homogeneously throughout the polyacrylate-polycarbonate copolymer for the above reasons of improved impact properties and low haze.

Surprisingly, in an embodiment, a polyacrylate-polycarbonate copolymer comprising a polyacrylate block and a polycarbonate block has low haze when compared to other impact modified polycarbonates, or polycarbonates modified with polysiloxane or polybutadiene blocks, and can also provide a high degree of transparency in a thermoplastic composition. The polyacrylate-polycarbonate copolymer has comparable or improved impact properties when compared with these other polycarbonates and polycarbonate copolymers. Further, the low haze of the polyacrylate-polycarbonate copolymer with polyacrylate blocks provides for thermoplastic compositions having other desirable properties such as: high gloss retention; low whiteness (i.e., low haze) for improved deep, rich color capability; and good weatherability. Acrylates have greater resistance to weathering by ultraviolet radiation and/or moisture in air, that is superior to other impact modifier compositions. It is believed that the use of the aforementioned polyacrylate polymers to prepare polyacrylate-polycarbonates provides excellent weathering according to an appropriate weathering protocol, such as that according to ASTM G155-04a. Further, the weather resistance of the polyacrylate blocks provides an improvement in color capability and surface gloss after weathering when compared to other impact modified polycarbonates having comparable impact properties. Thus, a low loading of less than or equal to 30 weight percent of the low $T_g$ acrylate oligomer can provide the desired impact properties, while maintaining the desired low haze. It will be understood by one skilled in the art that within such a limitation, combinations of parameters including polyacrylate block size, number of polyacrylate blocks, distribution of polyacrylate blocks, and composition of the polyacrylate blocks, may each be adjusted with respect to the other to achieve desirable haze and impact property performance from the polyacrylate-polycarbonate. In this way, the weight ratio of polyacrylate blocks and polycarbonate blocks can be selected to provide the desired haze and impact properties. In addition, compositions comprising the polyacrylate-polycarbonates disclosed herein have improved ductility, and lower shear stress than other impact modified polycarbonates, and thus have improved performance in minimizing aesthetic defects such as flow lines, and gate blush.

While it is not required to provide an explanation of how an invention works, such theories may be useful to for the purposes of better helping the reader to comprehend the invention. It is therefore to be understood that the claims are not to be limited by the following theory of operation. Thus, in an embodiment, it is believed that acrylate blocks of small size ($M_w$ of less than or equal to 20,000 g/mol), narrow molecular weight distributions ($M_w/M_n$ of less than or equal to 2), and having low concentration of the blocks as a weight percentage of the polyacrylate-polycarbonate copolymer (less than or equal to 30 wt %), provides for a more completely miscible block which, where a domain can form, provides a domain having a size of less than 20 nm in the longest dimension. The interphase boundary between the phases is therefore sufficiently small such that scattering of incident light is minimized, and the polymer composition attains a transparent appearance. The reduction, mitigation, or elimination of these phase-separated regions provides a thermoplastic composition having very low scattering of incident light, and hence low haze. In other embodiments, the polyacrylate block of the polyacrylate-polycarbonate may have an $M_n$ of greater than 20,000 g/mol, and less than or equal to 100,000 g/mol. A high molecular weight for the polyacrylate block may be desirable where greater impact properties relative to the lower $M_n$ blocks are desired. In addition, high molecular weight may provide polyacrylate-polycarbonates that are translucent or opaque, where it is desirable to have such optical properties in addition to surface gloss retention.

The composition from which the article for testing is molded can contain, in addition to the polyacrylate-polycarbonate, additives typically included with polycarbonates, such as colorants, mold release agents, and antioxidants, wherein the presence of these additives in an amount effective to perform the intended function does not significantly adversely affect the desired properties of the polyacrylate-polycarbonate. Typically, the total amount of these additives is less than or equal to 5.0 percent by weight of the total weight of components present in composition. In an exemplary embodiment, additives present in the thermoplastic composition used to prepare a molded article optical testing (haze and/or percent transmission and/or gloss retention) may include 0.2 to 0.4 weight percent pentaerythritol tetrastearate as a mold release agent, 0.01 to 0.04 weight percent of 2,6-di-tert-butylphenyl)phosphite as an antioxidant, and/or optionally 0 to 5 weight percent of colorant.

Thus, in an embodiment, a molded article having a thickness of 3.2±0.12 millimeters and consisting of the polyacrylate-polycarbonate has a haze of less than or equal to 10%, specifically less than or equal to 5%, more specifically less than or equal to 3%, still more specifically less than or equal to 2.5%, and still yet more specifically less than or equal to 2%, when measured according to ASTM D1003-00.

In another embodiment, a molded article having a thickness of 3.2±0.12 millimeters and consisting of the polyacrylate-polycarbonate may have a light transmittance (% T) of greater than or equal to 70%, specifically greater than or equal to 75%, more specifically greater than or equal to 80%, and still yet more specifically greater than or equal to 85%, when measured according to ASTM D1003-00.

The polyacrylate-polycarbonate may have low intrinsic (i.e., baseline) color. Thus, where addition of a colorant is useful, a colored thermoplastic composition so prepared has excellent color capability. In an embodiment, the low polyacrylate-polycarbonate provides excellent color capability wherein depth and jetness of color performance is desired. As used herein, the depth and jetness of the color after addition of colorant is a function of the transparency and clarity (i.e., low haze) of the polyacrylate-polycarbonate, without additional color and/or light scattering domains to alter the appearance of the pigmented polyacrylate-polycarbonate. In a specific embodiment, a deep, rich, jet black color may be obtained. In another embodiment, the low intrinsic color of the thermoplastic composition provides excellent color capability wherein a non-black pigment is used.

Polyacrylate-polycarbonates can provide excellent gloss retention upon weathering. Thus, in an embodiment, a molded color chip having a thickness of 3.2±0.12 mm and consisting of the polyacrylate-polycarbonate and less than or equal to 5 wt % additive has, after weathering according to ASTM G155-04a, and when measured according to ASTM D2457-03 at an angle of 60 degrees (°) and calibrated using a black glass standard of 100 GU, a surface gloss loss of less than or equal to 20%, specifically less than or equal to 15%, more specifically less than or equal to 10%, and still more specifically less than or equal to 5%, when compared to a comparable molded color chip consisting of an otherwise compositionally identical polycarbonate but without a polyacrylate block, and identical types and amounts of any additive used.

The mechanical properties of the polyacrylate-polycarbonates can be measured using impact strength. In an embodiment, a molded article having a thickness of 3.2±0.12 mm and consisting of the polyacrylate-polycarbonate has, when measured for Notched Izod Impact (NII) strength according to the method of ASTM D1238-04, a reduction in the ductile-to-brittle transition point temperature of greater than or equal to 10° C., specifically greater than or equal to 20° C., and still more specifically greater than or equal to 30° C., when compared to an otherwise compositionally identical polycarbonate but without a polyacrylate block. In another embodiment, the polyacrylate-polycarbonate has improved retention of impact properties upon heat aging when compared to an otherwise compositionally identical polycarbonate but without a polyacrylate block. In another embodiment, the polyacrylate-polycarbonate has improved thick section impact strength when compared to an otherwise compositionally identical polycarbonate but without a polyacrylate block.

The polyacrylate-polycarbonate polymer may be used to prepare a thermoplastic composition. The thermoplastic composition can further comprise an additive such as an additional resin including: polycarbonates as described above including homopolycarbonates, copolycarbonates, and polyester-polycarbonates; polysiloxane-polycarbonates; and polyesters. Other additives ordinarily incorporated with thermoplastic compositions of this type may be used as well. Combinations of additives may be used. Such additives may be mixed at a suitable time during the mixing of the components for forming the thermoplastic composition. Use of additives in the thermoplastic composition carries the proviso that the additive and amount are selected such that its inclusion does not significantly adversely affect the haze of the thermoplastic composition, and does not significantly adversely affect the desired mechanical properties of the thermoplastic composition, such as for example the impact properties.

The polyacrylate-polycarbonate copolymer is used in the thermoplastic composition in an amount effective to improve impact properties of the thermoplastic composition, while maintaining the haze at a suitably low level. Effective amounts are readily determined by one of ordinary skill in the art, and will vary depending upon the type of additional resin(s) and/or additives used, the type and amount of each of these resins and/or additives, and the intended use of the composition. The polyacrylate-polycarbonate copolymers are generally completely miscible with polycarbonates, and possess equivalent physical and rheological properties to comparable compositions prepared using acrylate impact modifiers.

Exemplary resins which can form a combination with the polyacrylate-polycarbonate include polycarbonates (and polyester-polycarbonates), as described above. In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxy groups or a trifunctional or multifunctional carboxylic acid has been incorporated. Furthermore, it is sometimes desirable to have various concentrations of acid and hydroxy end groups on the polyester, depending on the ultimate end use of the composition.

Useful polyesters may include aromatic polyesters, poly (alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of the foregoing. Also contemplated are aromatic polyesters with a minor amount, e.g., from 0.5 to 10 percent by weight, of units derived from an aliphatic diacid and/or an aliphatic polyol to make copolyesters.

Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(1,4-cyclohexanedimethylene terephthalate) (PCT). Combinations comprising at least one of the foregoing polyesters may also be used.

Copolymers comprising alkylene terephthalate repeating ester units with other ester groups may also be useful. Specifically useful ester units may include different alkylene terephthalate units, which can be present in the polymer chain as individual units, or as blocks of poly(alkylene terephthalates). Specific examples of such copolymers include poly(1,4-cyclohexanedimethylene terephthalate)-co-poly(ethylene terephthalate), abbreviated as PETG where the polymer comprises greater than or equal to 50 mole % of poly(ethylene terephthalate), and abbreviated as PCTG where the polymer comprises greater than 50 mole % of poly(1,4-cyclohexanedimethylene terephthalate).

Poly(cycloalkylene diester)s may include poly(alkylene cyclohexanedicarboxylate)s. Of these, a specific example is poly(1,4-cyclohexane-dimethanol-1,4-cyclohexanedicarboxylate) (PCCD), having recurring units of formula (76):

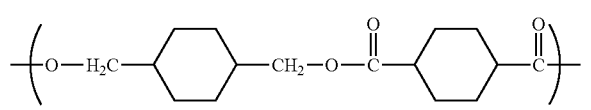

(76)

wherein, as described using formula (8), D is a dimethylene cyclohexane group derived from cyclohexane dimethanol, and T is a cyclohexane ring derived from cyclohexanedicarboxylate or a chemical equivalent thereof and is selected from the cis-isomer, trans-isomer, or a combination of cis- and trans- isomers.

The polyacrylate-polycarbonate and polyester may be used in a weight ratio of 1:99 to 99:1, specifically 10:90 to 90:10, and more specifically 30:70 to 70:30, based on the total weight of polyacrylate-polycarbonate and polyester, and depending on the function and properties desired.

Where a polyester is used, it is desirable for such the polyester and polyacrylate-polycarbonate blend to have a melt volume rate of 2 to 150 cc/10 min., specifically 3 to 100 cc/10 min, more specifically 3 to 80 cc/10 min, and still more specifically 5 to 50 cc/10 min., measured at 300° C. and a load of 1.2 kilograms according to ASTM D1238-04.

Other resins that can be used in the thermoplastic composition include polysiloxane-polycarbonate copolymers, also referred to as a polysiloxane-polycarbonate. The polysiloxane (also referred to herein as "polydiorganosiloxane") blocks of the polysiloxane-polycarbonate copolymer comprise repeating siloxane units (also referred to herein as "diorganosiloxane units") of formula (77):

(77)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of E in formula (77) may vary widely depending on the type and relative amount of each component in the thermoplastic composition, the desired properties of the composition, and like considerations. Generally, E may have an average value of 2 to 1,000, specifically 2 to 500, and more specifically 5 to 100. In one embodiment, E has an average value of 10 to 75, and in still another embodiment, E has an average value of 20 to 60.

A combination of a first and a second (or more) polysiloxane-polycarbonate copolymer may be used, wherein the average value of E of the first copolymer is less than the average value of E of the second copolymer.

In one embodiment, the polydiorganosiloxane blocks are provided by repeating structural units of formula (78):

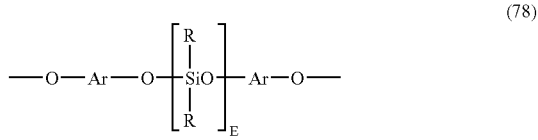

(78)

wherein E is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Ar groups in formula (78) may be derived from a $C_6$-$C_{30}$ dihydroxy aromatic compound, for example a dihydroxy aromatic compound of formula (3), (4), or (7) above. Combinations comprising at least one of the foregoing dihydroxy aromatic compounds may also be used. Specific Exemplary dihydroxy aromatic compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds may also be used.

Units of formula (78) may be derived from the corresponding dihydroxy aromatic compound of formula (79):

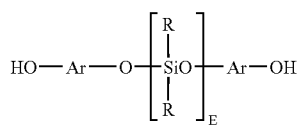

wherein R, Ar, and E are as described above. Compounds of formula (79) may be obtained by the reaction of a dihydroxy aromatic compound with, for example, an alpha, omega-bisacetoxypolydiorangonosiloxane under phase transfer conditions.

In another embodiment, polydiorganosiloxane blocks comprise units of formula (80):

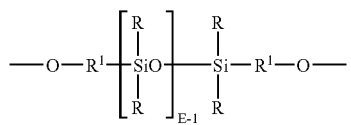

wherein R and E are as described above, and each occurrence of $R^1$ is independently a divalent $C_1$-$C_{30}$ alkylene, and wherein the polymerized polysiloxane unit is the reaction residue of its corresponding dihydroxy aromatic compound. In a specific embodiment, the polydiorganosiloxane blocks are provided by repeating structural units of formula (81):

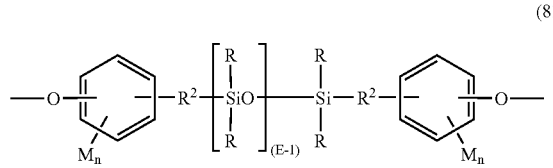

wherein R and E are as defined above. Each $R^2$ in formula (81) is independently a divalent $C_2$-$C_8$ aliphatic group. Each M in formula (81) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Units of formula (81) may be derived from the corresponding dihydroxy polydiorganosiloxane (82):

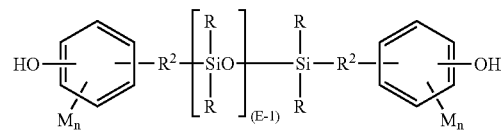

wherein R, D, M, $R^2$, and n are as described above. Such dihydroxy polysiloxanes can be made by effecting a platinum catalyzed addition between a siloxane hydride of formula (83):

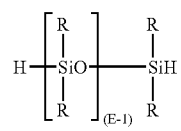

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing may also be used.

The polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may comprise polysiloxane units, and carbonate units derived from bisphenol A, e.g., the dihydroxy aromatic compound of formula (3) in which each of $A^1$ and $A^2$ is p-phenylene and $Y^1$ is isopropylidene. Polysiloxane-polycarbonates may have an $M_w$ of 2,000 to 100,000 g/mol, specifically 5,000 to 50,000 g/mol as measured by GPC using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 Kg, of 1 to 50 cubic centimeters per 10 minutes (cc/10 min), specifically 2 to 30 cc/10 min. Combinations of polysiloxane-polycarbonates of different flow properties may be used to achieve the overall desired flow property.

Thus, in an embodiment, the thermoplastic composition comprises the polyacrylate-polycarbonate and an additional resin. The weight ratio of polyacrylate-polycarbonate to additional resin in the thermoplastic composition can be, respectively, 1:99 to 99:1, specifically 10:90 to 90:10, more specifically 20:80 to 80:20, and still more specifically 30:70 to 70:30. It is understood that, where an added resin or combination of resins is used, the amount and type of the added resin(s) is selected such that the desired properties of the polyester-polycarbonate in the thermoplastic composition are not substantially adversely affected. In an embodiment, an additional resin comprises a polycarbonate, a polyester-polycarbonate, a polyester, a polysiloxane-polycarbonate, or a combination comprising at least one of the foregoing additional resins.

While it is contemplated that other resins may be used in the thermoplastic compositions described herein, the polyacrylate-polycarbonate copolymers are particularly suited for use in thermoplastic compositions that contain only polycarbonate-type resins as described herein (homopolycarbonates, polyester-polycarbonates, and combinations thereof). Thus, in an embodiment, a thermoplastic composition consists essentially of a polyacrylate-polycarbonate copolymer and a polycarbonate-type resin.

In addition to the above additional resins, the thermoplastic composition may comprise a colorant such as a pigment and/or dye additive. Useful pigments include, for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, anthrones, dioxazines, phthalocyanines, and azo lakes; Pigment Brown 24, Pigment Red 101, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Blue 60, Pigment Green 7, Pigment Yellow 119, Pigment Yellow 147, or Pigment Yellow 150; or combinations comprising at least one of the foregoing pigments. Pigments can be used in amounts of 0.01 to 10 parts by weight, based on 100 parts by weight of the polyacrylate-polycarbonate copolymer and any additional resin.

Dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as antistokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Where it is desirable to use organic dyes and pigments, the dyes may be screened to determine their sensitivity to gamma radiation at a given exposure dose or range of exposure doses. Dyes can be used in amounts of 0.01 to 10 parts by weight, based on 100 parts by weight of the polyacrylate-polycarbonate copolymer and any additional resin.

The thermoplastic composition may further comprise an ionizing radiation stabilizing additive. Exemplary ionizing radiation stabilizing additives include certain aliphatic alcohols, aromatic alcohols, aliphatic diols, aliphatic ethers, esters, diketones, alkenes, thiols, thioethers and cyclic thioethers, sulfones, dihydroaromatics, diethers, nitrogen compounds, or a combination comprising at least one of the foregoing. Alcohol-based stabilizing additives may be selected from mono, di-, or polysubstituted alcohols, and can be straight, branched, cyclic and/or aromatic. Aliphatic alcohols may include alkenols with sites of unsaturation, examples of which include 4-methyl-4-penten-2-ol, 3-methyl-pentene-3-ol, 2-methyl-4-penten-2-ol, 2,4-dimethyl-4-penten-2-ol, 2-phenyl-4-penten-2-ol, and 9-decen-1-ol; tertiary alcohols including 3-hydroxy-3-methyl-2-butanone, 2-phenyl-2-butanol, and the like; hydroxy-substituted tertiary cycloaliphatics such as 1-hydroxy-1-methyl-cyclohexane; and hydroxymethyl aromatics having an aromatic ring with carbinol substituents such as a methylol group (—$CH_2OH$) or a more complex hydrocarbon group such as (—CRHOH) or (—$CR_2OH$), wherein R is straight chain $C_1$-$C_{20}$ alkyl or branched $C_1$-$C_{20}$ alkyl. Exemplary hydroxy carbinol aromatics include benzhydrol, 2-phenyl-2-butanol, 1,3-benzenedimethanol, benzyl alcohol, 4-benzyloxy-benzyl alcohol, and benzyl-benzyl alcohol.

Useful classes of ionizing radiation stabilizing additives are di- and polyfunctional aliphatic alcohols, also referred to as aliphatic diols and aliphatic polyols. Specifically useful are aliphatic diols of formula (84):

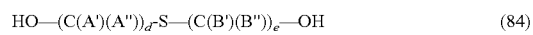

$$HO—(C(A')(A''))_d-S—(C(B')(B''))_e—OH \qquad (84)$$

wherein A', A", B', and B" are each independently H or $C_1$-$C_6$ alkyl; S is $C_1$-$C_{20}$ alkyl, $C_2$-$C_{20}$ alkyleneoxy, $C_3$-$C_6$ cycloalkyl, or $C_3$-$C_6$ substituted cycloalkyl; and d and e are each 0 or 1, with the proviso that, when d and e are each O, S is selected such that both —OH groups are not connected directly to a single common carbon atom.

In formula (84), A', A", B', and B" can each be independently selected from H, methyl, ethyl, n-propyl, isopropyl, n-butyl, sec-butyl, t-butyl, n-pentyl, 2-pentyl, 3-pentyl, isopentyl, neopentyl, n-hexyl, 2-hexyl, 3-hexyl, 2-methyl pentyl, 3-methylpentyl, 2,2-dimethylbutyl, 2,3-dimethylbutyl, and the like, and a combination comprising at least one of the foregoing alkyl groups.

Spacer group S can be selected from methanediyl, ethanediyl, 1,1-ethanediyl, 1,1-propanediyl, 1,2-propanediyl, 1,3-propanediyl, 2,2-propanediyl, 1,1-butanediyl, 1,2-butanediyl, 1,3-butanediyl, 1,4-butanediyl, 2,2-butanediyl, 2,3-butanediyl, 1,1-pentanediyl, 1,2-pentanediyl, 1,3-pentanediyl, 1,4-pentanediyl, 1,5-pentanediyl, 2,2-pentanediyl, 2,3-pentanediyl, 2,4-pentanediyl, 3,3-pentanediyl, 2-methyl-1,1-butanediyl, 3-methyl-1,1-butanediyl, 2-methyl-1,2-butanediyl, 2-methyl-1,3-butanediyl, 2-methyl-1,4-butanediyl, 2methyl-2,2-butanediyl, 2-methyl-2,3-butanediyl, 2,2-dimethyl-1,1-propanediyl, 2,2-dimethyl-1,2-propanediyl, 2,2-dimethyl-1,3-propanediyl, 3,3-dimethyl-1,1-propanediyl, 3,3-dimethyl-1,2-propanediyl, 3,3-dimethyl-2,2-propanediyl, 1,1-dimethyl-2,3-propanediyl, 3,3-dimethyl-2,2-propanediyl, 1,1-hexanediyl, 1,2-hexanediyl, 1,3-hexanediyl, 1,4-hexanediyl, 1,5-hexanediyl, 1,6-hexanediyl, 2,2-hexanediyl, 2,3-hexanediyl, 2,4-hexanediyl, 2,5-hexanediyl, 3,3-hexanediyl, 2-methyl-1,1-pentanediyl, 3-methyl-1,1-pentanediyl, 2-methyl-1,2-pentanediyl, 2-methyl-1,3-pentanediyl, 2-methyl-1,4-pentanediyl, 2-methyl-2,2-pentanediyl, 2-methyl-2,3-pentanediyl, 2-methyl-2,4-pentanediyl, 2,2-dimethyl-1,1-butanediyl, 2,2-dimethyl-1,2-butanediyl, 2,2-dimethyl-1,3-butanediyl, 3,3-dimethyl-1,1-butanediyl, 3,3-dimethyl-1,2-butanediyl, 3,3-dimethyl-2,2-butanediyl, 1,1-dimethyl-2,3-butanediyl, 3,3-dimethyl-2,2-butanediyl, and the like; isomers of octanediyl, decanediyl, undecanediyl, dodecanediyl, hexadecanediyl, octadecanediyl, icosananediyl, and docosananediyl; and substituted and unsubstituted cyclopropanediyl, cyclobutanediyl, cyclopentanediyl, cyclohexanediyl, wherein substituents may be the points of radical attachment, such as in 1,4-dimethylenecyclohexane, or may include branched and straight chain alkyl, cycloalkyl, and the like. Additionally, the spacer group S may be selected from at least one diradical comprising polyalkyleneoxy units, such as ethyleneoxy, 1,2-propyleneoxy, 1,3-propyleneoxy, 1,2-butyleneoxy, 1,4-butyleneoxy, 1,6-hexyleneoxy, and the like; and a combination comprising at least one of the foregoing.

Specific Exemplary aliphatic diols include ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,3-cyclobutanediol, 2,2,4,4-tetramethylcyclobutanediol, 1,2-cyclopentanediol, 1,2-cyclohexanediol, 1,3-cyclohexanediol, 1,4-cyclohexanediol, 1,4-dimethylolcyclohexane, and the like; branched acyclic diols such as 2,3-dimethyl-2,3-butanediol (pinacol), and 2-methyl-2,4-pentanediol (hexylene glycol); and polyalkyleneoxy-containing alcohols such as polyethylene glycol, polypropylene glycol, block or random poly(ethylene glycol-co-propylene glycols), and diols of copolymers containing polyalkyleneoxy-groups. Useful polyols may include polyaryleneoxy compounds such as polyhydroxystyrene; alkyl polyols such as polyvinylalcohol, polysaccharides, and esterified polysaccharides. A combination comprising at least one of the foregoing may also be useful. Exemplary diols include 2-methyl-2,4-pentanediol (hexylene glycol), polyethylene glycol, and polypropylene glycol.

Aliphatic ethers may include alkoxy-substituted cyclic or acyclic alkanes such as, for example, 1,2-dialkoxyethanes, 1,2-dialkoxypropanes, 1,3-dialkoxypropanes, alkoxycyclopentanes, alkoxycyclohexanes, and the like. Ester compounds (—COOR) may be useful as stabilizers wherein R may be a substituted or unsubstituted, aromatic or aliphatic, hydrocarbon and the parent carboxy compound may likewise be substituted or unsubstituted, aromatic or aliphatic, and/or mono- or polyfunctional. When present, substituents may include, for example, $C_1$-$C_8$ alkyl, $C_1$-$C_8$ alkyl ether, $C_6$-$C_{20}$ aryl, and the like. Esters which have proven useful include tetrakis(methylene [3,5-di-t-butyl-4-hydroxy-hydrocinnamate])methane, 2,2'-oxamido bis(ethyl-3-(3,5-di-t-butyl-4-hydroxyphenyl) propionate, and trifunctional hindered phenolic ester compounds such as GOOD-RITE® 3125, available from B.F. Goodrich in Cleveland Ohio.

Diketone compounds may also be used, specifically those having two carbonyl functional groups and separated by a single intervening carbon atoms such as, for example 2,4-pentadione.

Sulfur-containing compounds, useful as stabilizing additives, can include thiols, thioethers and cyclic thioethers. Thiols include, for example, 2-mercaptobenzothiazole; thioethers include dilaurylthiopropionate; and cyclic thioethers include 1,4-dithiane, 1,4,8,11-tetrathiocyclotetradecane. Cyclic thioethers containing more than one thioether group are useful, specifically those having a single intervening carbon between two thioether groups such as in, for example, 1,3-dithiane. The cyclic ring may contain oxygen or nitrogen members.

Aryl or alkyl sulfone stabilizing additives of general structure R—S(O)$_2$—R' may also be used, where R and R' comprise $C_1$-$C_{20}$ alkyl, $C_6$-$C_{20}$ aryl, $C_1$-$C_{20}$ alkoxy, $C_6$-$C_{20}$ aryloxy, substituted derivatives thereof, and the like, and wherein at least one of R or R' is a substituted or unsubstituted benzyl. When present, substituents may include, for example, $C_1$-$C_8$ alkyl, $C_1$-$C_8$ alkyl ether, $C_6$-$C_{20}$ aryl, and the like. An example of a specifically useful sulfone is benzylsulfone.

Alkenes may be used as stabilizing additives. Useful alkenes may include olefins of general structure RR'C=CR"R''' wherein R, R', R", and R''' may each individually be the same or different and may be selected from hydrogen, $C_1$-$C_{20}$ alkyl, $C_1$-$C_{20}$ cycloalkyl, $C_1$-$C_{20}$ alkenyl, $C_1$-$C_{20}$ cycloalkenyl, $C_6$-$C_{20}$ aryl, $C_6$-$C_{20}$ arylalkyl, $C_6$-$C_{20}$ alkylaryl, $C_1$-$C_{20}$ alkoxy, $C_6$-$C_{20}$ aryloxy and substituted derivatives thereof. When present, substituents may include, for example, $C_1$-$C_8$ alkyl, $C_1$-$C_8$ alkyl ether, $C_6$-$C_{20}$ aryl, and the like. The olefins may be acyclic, exocyclic, or endocyclic. Examples of specifically useful alkenes include 1,2-diphenyl ethane, allyl phenol, 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene, and the like, or a combination comprising at least one of the foregoing.

Hydroaromatic compounds may also be useful as stabilizing additives, including partially hydrogenated aromatics, and aromatics in combination with an unsaturated ring. Specific aromatics include benzene and/or naphthalene based systems. Exemplary hydroaromatic compounds include indane; 5,6,7,8-tetrahydro-1-naphthol; 5,6,7,8-tetrahydro-2-naphthol; 9,10-dihydro anthracene; 9,10-dihydrophenanthrene; 1-phenyl-1-cyclohexane; 1,2,3,4-tetrahydro-1-naphthol; and the like; or a combination comprising at least one of the foregoing.

Diethers, including hydrogenated and non-hydrogenated, and substituted and unsubstituted pyrans, may also be used as stabilizing additives. When present, substituents may include $C_1$-$C_8$ alkyl, $C_1$-$C_8$ alkyl ether, or $C_6$-$C_{20}$ aryl. The pyrans may have substituents including $C_1$-$C_{20}$ alkyl, $C_6$-$C_{20}$ aryl, $C_1$-$C_{20}$ alkoxy, or $C_6$-$C_{20}$ aryloxy, and which may be positioned on any carbon of the pyran ring. Specifically useful substituent groups include $C_1$-$C_{20}$ alkoxy or $C_6$-$C_{20}$ aryloxy, located on the ring at the six position. Hydrogenated pyrans are specifically useful. Exemplary diethers include dihydropyranyl ethers and tetrahydropyranyl ethers.

Nitrogen compounds which may function as stabilizers include high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amine compounds such as thiourea.

Ionizing radiation stabilizing additives are typically used in amounts of 0.001 to 1 parts per 100 parts of the polyacrylate-polycarbonate copolymer and any additional resin. In an embodiment, a useful ionizing radiation stabilizing additive is an aliphatic diol.

The thermoplastic composition may include fillers or reinforcing agents. The fillers and reinforcing agents may desirably be in the form of nanoparticles, i.e., particles with a median particle size ($D_{50}$) smaller than 100 nm as determined using light scattering methods. Where used, useful fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Specifically, useful fillers contemplated herein are visual effects fillers that possess compositional, shape and dimensional qualities suitable to the reflection and/or refraction of light. Visual effect fillers include those having planar facets and can be multifaceted or in the form of flakes, shards, plates, leaves, wafers, and the like. The shape can be irregular or regular. A non-limiting example of a regular shape is a hexagonal plate. Visual effect fillers are two dimensional, plate-type fillers, wherein a particle of a plate type filler has a ratio of its largest dimension to smallest dimension of greater than or equal to 3:1, specifically greater than or equal to 5:1, and more specifically greater than or equal to 10:1. The largest dimension so defined can also be referred to as the diameter of the particle. Plate-type fillers have a distribution of particle diameters described by a minimum and a maximum particle diameter. The minimum particle diameter is described by the lower detection limit of the method used to determine particle diameter, and corresponds to it. A typical method of determining particle diameters is laser light scattering, which can for example have a lower detection limit for particle diameter of 0.6 nanometers. It should be noted that particles having a diameter less than the lower detection limit may be present but not observable by the method. The maximum particle diameter is typically less than the upper detection limit of the method. The maximum particle diameter herein may be less than or equal to 1,000 micrometers, specifically less than or equal to 750 micrometers, and more specifically less than or equal to 500 micrometers. The distribution of particle diameters can be unimodal, bimodal, or multimodal. The diameter can be described more generally using the mean of the distribution of the particle diameters, also referred to as the mean diameter. Specifically, useful particles have a mean diameter of 1 to 100 micrometers, specifically 5 to 75 micrometers, and more specifically 10 to 60 micrometers. Specific reflective fillers are further of a composition having an optically dense surface exterior finish useful for reflecting incident light. Metallic and non-metallic fillers such as those based on aluminum, silver, copper, bronze, steel, brass, gold, tin, silicon, alloys of these, combinations comprising at least one of the foregoing metals, and the like, are specifically useful. Also specifically useful are inorganic fillers prepared from a composition presenting a surface that is useful for reflecting and/or refracting incident light. In contrast to a reflective filler, a refractive filler having refractive properties can be at least partially transparent, i.e., can allow transmission of a percentage of incident light, and can provide optical properties based on reflection, refraction, or a combination of reflection and refraction of incident light. Inorganic fillers having light reflecting and/or refracting properties useful herein may include micas, alumina, lamellar talc, silica, silicon carbide, glass, combinations comprising at least one of the foregoing inorganic fillers, and the like.

It is believed that the use of visual effects fillers with polyacrylate-polycarbonates can provide an enhancement of the desired visual effects due to the increased transparency and/or lower haze of the polyacrylate-polycarbonates relative to compositionally different copolymers having lower transparency and/or greater haze. Such improved visual effects may be observable at a greater depth in an article comprising the polyacrylate-polycarbonate than would be observed in an article that does not comprise the polyacrylate-polycarbonate. In addition, such an improved appearance of an article comprising the visual effects filler may be obtained without substantially adversely affecting the mechanical properties of the polyacrylate-polycarbonate.

The fillers and reinforcing agents may be coated with a layer of metallic material to facilitate conductivity, or surface treated with silanes to improve adhesion and dispersion with the polyacrylate-polycarbonate matrix. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Exemplary cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers can be used in amounts of 0 to 90 parts by weight, based on 100 parts by weight of the polyacrylate-polycarbonate copolymer and any additional resin.

The thermoplastic composition may also include antioxidant additives. Exemplary organophosphites include tris (nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxyated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like; or combinations comprising at least one of the foregoing antioxidants. An exemplary antioxidant is SANDOSTAB® P-EPQ phosphite stabilizer, commercially available from Clariant. Antioxidants can be used in amounts of 0.0001 to 1 parts by weight, based on 100 parts by weight of the polyacrylate-polycarbonate copolymer and any additional resin.

Exemplary heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 parts by weight, based on 100 parts by weight of the polyacrylate-polycarbonate copolymer and any additional resin.

Light stabilizers and/or ultraviolet light (UV) absorbing additives may also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 parts by weight, based on 100 parts by weight of the polyacrylate-polycarbonate copolymer and any additional resin.

The thermoplastic composition may also include an ultraviolet (UV) absorbing additive, also referred to as a UV absorber. Compounds for use as UV absorbing additives include, for example, hydroxybenzophenones; hydroxybenzotriazoles; hydroxybenzotriazines; cyanoacrylates; oxanilides; benzoxazinones; or a combination comprising at least one of the foregoing. Specifically useful commercially available UV absorbers include TINUVIN 234, TINUVIN® 329, TINUVIN® 350, and TINUVIN® 360, commercially available from Ciba Specialty Chemicals; 2-(2H-benzotriazol-2-yl)-4-(1,1,3,3-tetramethylbutyl)-phenol (CYASORB® 5411), 2-hydroxy-4-n-octyloxybenzophenone (CYASORB® 531), 2-[4,6-bis(2,4-dimethylphenyl)-1,3,5-triazin-2-yl]-5-(octyloxy)-phenol (CYASORB® 1164), 2,2'-(1,4-phenylene)-bis-(4H-3,1-benzoxazin-4-one) (CYASORB® UV-3638), CYASORB® UV absorbers, available from Cyanamide; and 2,2'-(1,4-phenylene) bis(4H-3,1-benzoxazin-4-one), 1,3-bis[(2-cyano-3,3-diphenylacryloyl)oxy]-2,2-bis[[(2-cyano-3,3-diphenylacryloyl)oxy]methyl] propane, and 1,3-bis[(2-cyano-3,3-diphenylacryloyl)oxy]-2,2-bis[[(2-cyano-3,3-diphenylacryloyl)oxy]methyl]propane (UVINUL® 3030), commercially available from BASF. In addition, UV absorbers may include nano-size inorganic materials such as titanium oxide, cerium oxide, zinc oxide, or the like, all with particle size less than 100 nanometers, may be used. Combinations comprising at least one of the foregoing UV absorbers may be used. UV absorbers can be used in amounts of 0.0001 to 1 parts by weight, based on 100 parts by weight of the polyacrylate-polycarbonate copolymer and any additional resin.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxy-carbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; combinations of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a solvent; waxes such as beeswax, montan wax, paraffin wax or the like. Such materials can be used in amounts of 0.001 to 1 percent by weight, specifically 0.01 to 0.75 percent by weight, more specifically 0.1 to 0.5 parts by weight, based on 100 parts by weight of the polyacrylate-polycarbonate copolymer and any additional resin.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 available from Sanyo, Pebax® MH1657 available from Atofina, or Irgastat® P18 and P22 both available from Ciba-Geigy. Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 parts by weight, based on 100 parts by weight of the polyacrylate-polycarbonate copolymer and any additional resin.

Flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other exemplary aromatic phosphates iclude, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

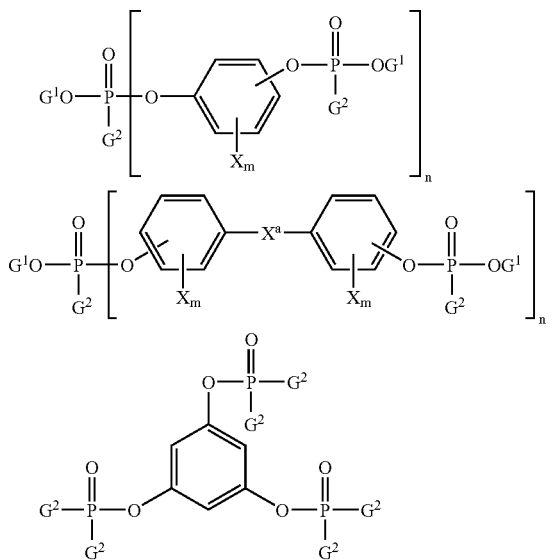

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants can be present in amounts of 0.1 to 10 parts by weight, based on 100 parts by weight of the polyacrylate-polycarbonate copolymer and any additional resin.

Halogenated materials may also be used as flame retardants, for example halogenated compounds and resins of formula (85):

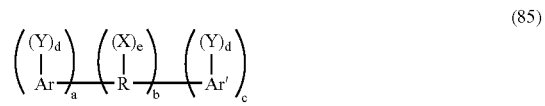

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (85) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; ether groups of the general formula OX', wherein X' is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxy and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 parts by weight, based on 100 parts by weight of the polyacrylate-polycarbonate copolymer and any additional resin.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 parts by weight, based on 100 parts by weight of the polyacrylate-polycarbonate copolymer and any additional resin.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. An exemplary TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 parts by weight, based on 100 parts by weight of the polyacrylate-polycarbonate copolymer and any additional resin.

Thus, in an embodiment, the thermoplastic composition may comprise an additive selected from filler, ionizing radiation stabilizer, antioxidant, heat stabilizer, light stabilizer, ultraviolet light absorber, plasticizer, lubricant, mold release agent, antistatic agent, pigment, dye, flame retardant, anti-drip agent, or a combination comprising at least one of the foregoing.

The thermoplastic composition may be manufactured by methods generally available in the art. In an exemplary embodiment, powdered polycarbonate, polyacrylate-polycarbonate copolymer, and other optional components are first blended, in a HENSCHEL-Mixer® high speed mixer. Other low shear processes including but not limited to hand mixing may also accomplish this blending. The blend is then fed into the throat of an extruder via a hopper. Alternatively, at least one of the components may be incorporated into the composition by feeding directly into the extruder at the throat and/or downstream through a sidestuffer. Where desired, the polyacrylate-polycarbonate copolymer, and any desired additional resin and/or additives may also be compounded into a masterbatch and combined with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a polyacrylate-polycarbonate copolymer and an additive. The melt combining can be done by extrusion. In an embodiment, the proportions of polyacrylate-polycarbonate copolymer, any added resin, and additive, are selected such that the optical properties of the thermoplastic composition are maximized while mechanical performance is at a desirable level. In a further specific embodiment, an additive is combined with the polyacrylate-polycarbonate copolymer to make the thermoplastic composition. In an embodiment, the proportions polyacrylate-polycarbonate copolymer, additional resin, or other additive, are selected such that the optical properties of the thermoplastic composition are maximized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Other embodiments include articles comprising any of the above-described compositions. For example, the article may comprise a film, sheet, molded object, membrane, or composite, wherein the film, sheet, molded object, or composite has at least one layer comprising the composition. Thermoplastic compositions as disclosed herein may be made into articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, lubricity, and biocompatibility. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt, or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (a.) Providing a single or multi-layer thermoplastic substrate having optionally at least one colors on the surface, for instance, using screen printing or a transfer dye; (b.) Conforming the substrate to a mold configuration such as by forming and trimming a substrate into a three dimensional shape and fitting the substrate into a mold having a surface which matches the three dimensional shape of the substrate; (c.) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition may further be applied to the above articles to alter surface appearances and impart additional functionalities to the articles.

Shaped, formed, or molded articles comprising the thermoplastic compositions are also provided. The thermoplastic compositions may be molded into useful shaped articles by a variety of methods such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative weatherable articles that may be fabricated using the thermoplastic compositions provided herein include aircraft, automotive, truck, military vehicle (including automotive, aircraft, and water-borne vehicles), agricultural equipment (including interior and exterior tractor parts, combines etc.), industrial equipment (such interior and exterior parts on backhoes, front-end loader etc.) and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, helms, hatches, swimming decks and housings; outboard motor housings; depth finder housings, personal water-craft; jet-skis; pools and pool parts; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. Additional fabrication operations may be performed on articles, such as, but not limited to molding, in-mold decoration, baking in a paint oven, lamination, and/or thermoforming.

In an embodiment, the thermoplastic composition (or articles prepared therefrom) may exhibit at least one of the following desirable properties: a percent haze of less than or equal to 10%, more specifically less than or equal to 5%, and more specifically less than or equal to 1%, when measured at a thickness of 3.2±0.12 mm according to ASTM D1003-00; a melt volume ratio (MVR) of 1 to 40, more specifically 2 to 25 cm$^3$/10 minutes, measured at 300° C. under a load of 1.2 kg in accordance with ISO 1133; a heat deformation temperature (HDT) of 110 to 170° C. when measured at 0.455 megaPascals (MPa) according to ISO 179; or a Notched Izod Impact (NH) strength of 600 to 1,000 Joules per meter (J/m), when measured according to ASTM D256-04 at 23° C. The thermoplastic composition may further have a % tensile elongation of 30 to 120%, when measured in accordance with ASTM D256-04. Further, the thermoplastic composition may have a yellowness index (YI) of less than or equal to 30, as measured according to ASTM D1925-70 on 3.2±0.12 mm thick test specimens.

The thermoplastic composition is further illustrated by the following non-limiting examples.

Methods for preparation of polymers of the present disclosure are provided as Examples 1-29, below, each of which is a prophetic example. For each of the general procedures described as Examples 1-14, reactions are performed using a polycondensation reactor comprising either of a two-liter, five neck Morton flask equipped with mechanical stirrer, reflux condenser, pH probe, phosgene gas inlet and base solution inlet, or a similarly outfitted five-liter flask. Additionally, one peristaltic pump is used for metered delivery of base solution. For Examples 15-25, a 30 liter reactor is used equipped with a mechanical stirrer, reflux condenser, a recirculation loop containing a pH probe, and addition ports for each additive with the appropriate metering and flow control devices. Thermoplastic compositions comprising the polyacrylate-polycarbonates and preparable by extrusion are described in Examples 26-29, each of which is a prophetic example.

EXAMPLE 1

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (27) (2.5 g, $M_n$=2,000 g/mol); (c) triethylamine (TEA) (0.03 ml, 0.26 mmol); (d) methylene chloride (350 ml); and (e) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, paracumylphenol (PCP) (0.7 g, 3.3 mmol) is added to the reactor, and the pH is brought to 10.5 with base. TEA (0.2 ml, 1.7 mmol) is added to the reaction, and the reactor contents are stirred for 15 minutes. An additional 4 grams of phosgene is added to ensure complete polymerization. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 2

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) triethylamine (TEA) (0.03 ml, 0.26 mmol); (c) methylene chloride (350 ml); and (d) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, the disodium salt of a polymer of formula (27) (2.5 g, 1 mmol, predispersed in 10 ml of $CH_2Cl_2$, 10 ml of water and 1 ml of 50% aqueous sodium hydroxide) and paracumylphenol (PCP) (0.7 g, 3.3 mmol) is added to the reactor, and the pH is brought to 10.5 with base. TEA (0.2 ml, 1.7 mmol) is added to the reaction, and the reactor contents are stirred for 15 minutes. An additional 4 grams of phosgene is added to ensure complete polymerization. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 3

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (28) (2.5 g, $M_n$=5,000 g/mol, 0.5 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 4

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (28) (1.5 g, $M_n$=3,000 g/mol, 0.5 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 5

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (27) (2.5 g, $M_n$=50,000 g/mol); (c) triethylamine (TEA) (0.03 ml, 0.26 mmol); (d) methylene chloride (350 ml); and (e) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, paracumylphenol (PCP) (0.7 g, 3.3 mmol) is added to the reactor, and the pH is brought to 10.5 with base. TEA (0.2 ml, 1.7 mmol) is added to the reaction, and the reactor contents are stirred for 15 minutes. An additional 4 grams of phosgene is added to ensure complete polymerization. Upon completion of the reaction, the reaction is purged with nitrogen gas, and the organic layer is separated from the aqueous layer. The organic layer is extracted with aqueous HCl, water three times, and precipitated into water. The polymer is allowed to dry in an oven overnight before analysis.

EXAMPLE 6

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) triethylamine (TEA) (0.03 ml, 0.26 mmol); (c) methylene chloride (350 ml); and (d) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, the disodium salt of a polymer of formula (27) (5.0 g, 50,000 g/mol, predispersed in 10 ml of $CH_2C_{12}$, 10 ml of water and 1 ml of 50% aqueous sodium hydroxide) and PCP (0.7 g, 3.3 mmol) is added to the reactor, and the pH is brought to 10.5 with base. TEA (0.2 ml, 1.7 mmol) is added to the reaction, and the reactor contents are stirred for 15 minutes. An additional 4 grams of phosgene is added to ensure complete polymerization. Upon completion of the reaction, the reaction is purged with nitrogen gas, and the organic layer is separated from the aqueous layer. The organic layer is extracted with aqueous HCl, water three times, and precipitated into water. The polymer is allowed to dry in an oven overnight before analysis.

EXAMPLE 7

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (28) (4.5 g, $M_n$=45,000 g/mol, 0.1 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. Upon completion of the reaction, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 8

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (28) (3.3 g, $M_n$=33,000 g/mol, 0.1 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. Upon completion of the reaction, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

Samples of polymer from Examples 1-8 are extrudable into pellets that may be formed into plaques that possess the characteristics given in Table 1.

TABLE 1

| Material | Appearance |
|---|---|
| Ex 1 | Transparent |
| Ex 2 | Transparent |
| Ex 3 | Transparent |
| Ex 4 | Transparent |
| Ex. 5 | Opaque |
| Ex. 6 | Opaque |
| Ex. 7 | Opaque |
| Ex. 8 | Opaque |

Examples 5-8 deriving from polyacrylate-polycarbonate materials having polyacrylate block sizes of greater than 220 acrylate block units have high opacity (i.e., high haze of greater than 10%). The higher molecular weight polyacrylate-rich regions can phase-separate from the bisphenol A polycarbonate-rich segments of the copolymer to form an opaque, 2-phase system. Optical clarity (transparency and low haze) in Examples 1-4 comprising polyacrylate-polycarbonate materials having polyacrylate block lengths of less than or equal to 220 acrylate block units is desirable for thermoplastic applications requiring optical clarity and/or a high gloss finished appearance.

EXAMPLE 9

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (57) (2.5 g, $M_n$=10,000 g/mol); (c) triethylamine (TEA) (0.03 ml, 0.26 mmol); (d) methylene chloride (350 ml); and (e) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, paracumylphenol (PCP) (0.7 g, 3.3 mmol) is added to the reactor, and the pH is brought to appx. 10.5 with base. TEA (0.2 ml, 1.7 mmol) is added to the reaction, and the reactor contents are stirred for 15 minutes. An additional 4 grams of phosgene is added to ensure complete polymerization. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 10

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) triethylamine (TEA) (0.03 ml, 0.26 mmol); (c) methylene chloride (350 ml); and (d) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, the disodium salt of a polymer of formula (57) (2.5 g, 0.25 mmol, predispersed in 10 ml of CH$_2$Cl$_2$, 10 ml of water and 1 ml of 50% aqueous sodium hydroxide) and paracumylphenol (PCP) (0.7 g, 3.3 mmol) is added to the reactor, and the pH is brought to appx. 10.5 with base. TEA (0.2 ml, 1.7 mmol) is added to the reaction, and the reactor contents are stirred for 15 minutes. An additional 4 grams of phosgene is added to ensure complete polymerization. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 11

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (58) (2.5 g, M$_n$=5,000 g/mol, 0.5 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 12

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (58) (4 g, M$_n$=10,000 g/mol, 0.4 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 13

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) a polymer of formula (74) (2.5 g, M$_n$=5,000 g/mol, 0.5 mmol) (c) PCP (0.7 g, 3.3 mmol), (d) triethylamine (0.23 ml, 0.002 mol); (e) methylene chloride (250 ml); and (f) de-ionized water (150 ml). The mixture is charged with phosgene (14.45 g, 2 g/min, 0.143 mol). During the addition of phosgene, base (50 wt % NaOH in deionized water) is simultaneously charged to the reactor to maintain the pH of the reaction at 9 to 11. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 14

The following is added into a 2 L, 5 necked Morton flask, equipped with an overhead condenser, an overhead stirrer, a pH probe, a caustic solution inlet, and a phosgene inlet: (a) 4,4-bis-(hydroxyphenyl)-2,2-propane (BPA) (25 g, 0.11 mol); (b) triethylamine (TEA) (0.03 ml, 0.26 mmol); (c) methylene chloride (350 ml); and (d) de-ionized water (200 ml). The mixture is charged with phosgene (10.04 g, 2 g/min, 0.1 mol). During the addition of phosgene, base (50 wt % NaOH in deionized water) is simultaneously charged to the reactor to maintain the pH of the reaction at 8 to 8.5. After the addition of phosgene, the disodium salt of a polymer of formula (75) (2.5 g, 1 mmol, predispersed in 10 ml of CH$_2$Cl$_2$, 10 ml of water and 1 ml of 50% aqueous sodium hydroxide) and paracumylphenol (PCP) (0.7 g, 3.3 mmol) is added to the reactor, and the pH is brought to 10.5 with base. TEA (0.2 ml, 1.7 mmol) is added to the reaction, and the reactor contents are stirred for 15 minutes. An additional 4 g of phosgene is added to ensure complete polymerization. After the reaction is complete, the reaction is purged with nitrogen gas, and the organic layer is allowed to separate from the aqueous layer. The organic layer is extracted, washed with aqueous HCl, water three times, and precipitated into water. The polymer is allowed to dry in an oven overnight before analysis.

EXAMPLE 15

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). A solution of 406 g of a 1:1 molar ratio of isophthaloyl and terephthaloyl chlorides in 712 g of methylene chloride is added to the mixture at a rate of 55.9 g/min. Concurrently, 281.6 g of 50% aqueous sodium hydroxide is added at a rate of 14.1 g/min. After the addition is complete approximately 38 g of 50% aqueous sodium hydroxide is slowly added until a pH of 8.0 to 8.5 is achieved. After stirring for 5 min, 130 g of functionalized n-butylacrylate macromer of formula (27) (M$_w$=appx. 10,000 g/mol) is added to the polyester oligomer along with 4,4-bis-(hydroxyphenyl)-2,2-propane (BPA) (1826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1130 g at 20 g/min). During the addition of phosgene, base (50 wt % NaOH in deionized water) is simultaneously charged to the reactor to maintain the pH of the reaction at 8 to 8.5 during the addition of the initial 500 g of phosgene. When 500 g of phosgene is added, the rate of base addition is adjusted to maintain a pH of 9.0 to 9.5. Upon completion of addition of the phosgene, the reaction mixture is stirred for 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 16

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). A solution of 406 g of (isophthaloyl and terephthaloyl chloride, in a 1:1 ratio) in 712 g of methylene chloride is added to the mixture at a rate of 55.9 g/min. Concurrently, 281.6 g of 50% aqueous sodium hydroxide is added at a rate of 14.1 g/min. After the addition is complete approximately 38 g of 50% aqueous sodium hydroxide is slowly added until a pH of 8.0 to 8.5 is achieved. After stirring for 5 min, 130 g of functionalized n-butylacrylate macromer of formula (28) ($M_w$=appx. 15,000 g/mol) is added to the polyester oligomer along with 4,4-bis-(hydroxyphenyl)-2,2-propane (BPA) (1826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1130 g, 20 g/min). During the addition of phosgene, base (50 wt % NaOH in deionized water) is simultaneously charged to the reactor to maintain the pH of the reaction at 8.0 to 8.5 during the 500 g of phosgene. Upon addition of about 500 g of phosgene, the rate of base addition is adjusted to maintain a pH of 9.0 to 9.5. Upon completion of addition of the phosgene, the reaction mixture is stirred for 3 min. The polymer solution is then separated from the brine layer and washed twice with dilute HCl and three times with dionized water. The polymer is isolated by steam precipitation, and is dried in a fluidized bed dryer using hot nitrogen gas.

EXAMPLE 17

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). Then a solution of 406 g of (isophthaloyl and terephthaloyl chloride, in a 1:1 molar ratio) in 712 g of methylene chloride is added to the mixture at 55.9 g/min. Concurrently, 281.6 g of 50% aqueous sodium hydroxide is added at 14.1 g/min. After the addition is complete approximately 38 g of 50% aqueous sodium hydroxide is slowly added until a pH of 8.0 to 8.5 is achieved. After stirring for 5 min, 130 g of functionalized n-butylacrylate macromer of formula (56) ($M_w$=appx. 8,000 g/mol) is added to the polyester oligomer along with 4,4-bis-(hydroxyphenyl)-2,2-propane (BPA) (1826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1130 g, 20 g/min). During the addition of phosgene, base (50 wt % NaOH in deionized water) is simultaneously charged to the reactor to maintain the pH at 8 to 8.5 during the initial 500 g of phosgene. Upon addition of about 500 g of phosgene, the rate of base addition is adjusted to maintain a pH of 9.0 to 9.5. Upon completion of addition of the phosgene, the reaction mixture is stirred for 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 18

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). Then a solution of 406 g of (isophthaloyl and terephthaloyl chloride, in a 1:1 molar ratio) in 712 g of methylene chloride is added to the mixture at 55.9 g/min. Concurrently, 281.6 g of 50% aqueous sodium hydroxide is added at 14.1 g/min. After the addition is complete approximately 38 g of 50% aqueous sodium hydroxide is slowly added until a pH of 8.0 to 8.5 is achieved. After stirring for 5 min, 78 g of functionalized macromer 53 (in this case the macromer is prepared with 2-ethylhexyl acrylate instead of n-butyl acrylate, $M_w$=appx. 5,000 g/mol) is added to the polyester oligomer along with 4,4-bis-(hydroxyphenyl)-2,2-propane (BPA) (1,826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1,130 g, 20 g/min). During the addition of phosgene, base (50 wt % NaOH in deionized water) is simultaneously charged to the reactor to maintain the pH of the reaction at 8.0 to 8.5 during the addition of the initial 500 g of phosgene. Upon addition of about 500 g of phosgene, the rate of base addition is adjusted to maintain a pH of 9.0 to 9.5. Upon completion of addition of the phosgene, the reaction mixture is stirred for 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 19

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). Then a solution of 406 g of (isophthaloyl and terephthaloyl chloride, in a 1:1 molar ratio) in 712 g of methylene chloride is added to the mixture at 55.9 g/min. Concurrently, 281.6 g of 50% aqueous sodium hydroxide is added at 14.1 g/min. After the addition is complete approximately 38 g of 50% aqueous sodium hydroxide is slowly added until a pH of 8.0 to 8.5 is achieved. After stirring for 5 min, 130 g of functionalized n-butylacrylate macromer of formula (58) ($M_w$=appx. 15,000 g/mol) is added to the polyester oligomer along with 4,4-bis-(hydroxyphenyl)-2,2-propane (BPA) (1,826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1130 g, 20 g/min). During the addition of phosgene, base (50 wt % NaOH in deionized water) is simultaneously charged to the reactor to maintain the pH of the reaction at 8.0 to 8.5 during the addition of the initial 500 g of phosgene. Upon addition of about 500 g of phosgene, the rate of base addition is adjusted to maintain a pH of 9.0 to 9.5. After the addition of phosgene is complete, the reaction mixture is stirred for 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 20

A 30 L flask is equipped with an overhead condenser, an overhead stirrer, a pH probe, a caustic solution inlet, and a phosgene inlet, and charged with: (a) resorcinol (286.3 g, 2.60 mol); (b) triethylamine (TEA) (5.6 ml, 0.04 mol); (c) methylene chloride (1.5 L); and (d) de-ionized water (126 ml). Then a solution of 406 g of (isophthaloyl and terephthaloyl chloride, in a 1:1 molar ratio) in 712 g of methylene chloride is added to the mixture at 55.9 g/min. Concurrently, 281.6 g of 50% aqueous sodium hydroxide is added at 14.1 g/min. After the addition is complete approximately 38 g of 50% aqueous sodium hydroxide is slowly added until a pH of 8.0 to 8.5 is achieved. After stirring for 5 min, 130 g of functionalized n-butylacrylate macromer of formula (74) ($M_w$=appx. 10,000 g/mol) is added to the polyester oligomer along with 4,4-bis-(hydroxyphenyl)-2,2-propane (BPA) (1826 g, 8.0 mol), p-cumylphenol (78.76 g, 0.371 mol), triethylamine (TEA) (16 g, 0.16 mol), methylene chloride (11.5 L); and de-ionized water (6.6 L). The mixture is charged with phosgene (1130 g, 20 g/min). During the addition of phosgene, base (50 wt % NaOH in deionized water) is simultaneously charged to the reactor to maintain the pH of the reaction at 8 to 8.5 during the addition of the initial 500 g of phosgene. Upon addition of about 500 g of phosgene, the rate of base addition is adjusted to maintain a pH of 9.0 to 9.5. Upon completion of addition of the phosgene, the reaction mixture is stirred for 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 21

A 30 L flask is equipped with an overhead condenser, an overhead stirrer, a pH probe, a caustic solution inlet, and a phosgene inlet, and charged with: (a) resorcinol (759.8 g, 6.90 mol); (b.) p-cumylphenol (57.35 g, 0.2701 mol); (c.) 53.1 g of functionalized oligomer n-butylacrylate macromer of formula (28) ($M_w$=appx. 3,000 g/mol) (d) triethylamine (TEA) (12.1 g, 0.12 mol); (e) methylene chloride (4.1 L); and (f) de-ionized water (1 L). Then a solution of 1,218 g of isophthaloyl and terephthaloyl chloride (in a 1:1 molar ratio of isomers) in 2,136 g of methylene chloride is added to the mixture at a rate of 168 g/min. Concurrently, 845 g of 50% aqueous sodium hydroxide is added at a rate of 42.2 g/min. After the addition is complete approximately 115 g of 50% aqueous sodium hydroxide is slowly added until a pH of 8.0 to 8.5 is achieved. After stirring for 5 min, 4,4-bis-(hydroxyphenyl)-2,2-propane (BPA) (187 g, 0.82 mol), methylene chloride (0.89 L), and de-ionized water (4.2 L) is added. The mixture is charged with phosgene (175 g, 20 g/min). During the addition of phosgene, base (50 wt % NaOH in deionized water) is simultaneously charged to the reactor to maintain the pH of the reaction at 8 to 8.5 during the addition of the initial 90 g of phosgene. Upon addition of about 90 g of phosgene, the rate of base addition is adjusted to maintain a pH of 9.0 to 9.5. Upon completion of addition of the phosgene, the reaction mixture is stirred for 3 min, at which time the pH is reduced to about 8. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 22

A 30 L flask is equipped with an overhead condenser, an overhead stirrer, a pH probe, a caustic solution inlet, and a phosgene inlet, and charged with: (a) resorcinol (759.8 g, 6.90 mol); (b.) p-cumylphenol (57.35 g, 0.2701 mol); (c.) 53.1 g of functionalized macromer of formula (58) (in this case the macromer is prepared with a 1:1 molar ratio of n-butyl and 2-ethylhexyl acrylate; $M_w$=appx. 15,000 g/mol) (d) triethylamine (TEA) (12.1 g, 0.12 mol); (e) methylene chloride (4.1 L); and (f) de-ionized water (1 L). Then a solution of 1,218 g of isophthaloyl and terephthaloyl chloride (in a 1:1 molar ratio of isomers) in 2,136 g of methylene chloride is added to the mixture at 168 g/min. Concurrently, 845 g of 50% aqueous sodium hydroxide is added at 42.2 g/min. After the addition is complete approximately 115 g of 50% aqueous sodium hydroxide is slowly added until a pH of 8.0 to 8.5 is achieved. After stirring for 5 min, 4,4-bis-(hydroxyphenyl)-2,2-propane (BPA) (187 g, 0.82 mol), methylene chloride (0.89 L), and de-ionized water (4.2 L) is added. The mixture is charged with phosgene (175 g, 20 g/min). During the addition of phosgene, base (50 wt % NaOH in deionized water) is simultaneously charged to the reactor to maintain the pH of the reaction at 8 to 8.5 during the addition of the initial 90 g of phosgene. Upon addition of about 90 g of phosgene, the rate of base addition is adjusted to maintain a pH of 9.0 to 9.5. Upon completion of addition of the phosgene, the reaction mixture is stirred for 3 min., at which time the pH is reduced to about 8 by decreasing the rate of addition of base to the reaction. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 23

A 30 L flask is equipped with an overhead condenser, an overhead stirrer, a pH probe, a caustic solution inlet, and a phosgene inlet, and charged with: (a) resorcinol (759.8 g, 6.90 mol); (b.) p-cumylphenol (57.35 g, 0.2701 mol); (c.) 53.1 g of functionalized oligomer n-butylacrylate macromer of formula (28) ($M_w$=appx 5,000 g/mol) (d) triethylamine (TEA) (12.1 g, 0.12 mol); (e) methylene chloride (4.1 L); and (f) de-ionized water (1 L). Then a solution of 1,218 g of isophthaloyl and terephthaloyl chloride (in a 1:1 molar ratio of isomers) in 2,136 g of methylene chloride is added to the mixture at 168 g/min. Concurrently, 845 g of 50% aqueous sodium hydroxide is added at 42.2 g/min. After the addition is complete approximately 115 g of 50% aqueous sodium hydroxide is slowly added until a pH of 8.0 to 8.5 is achieved. After stirring for 5 min, 4,4-bis-(hydroxyphenyl)-2,2-propane (BPA) (187 g, 0.82 mol), methylene chloride (0.89 L), and de-ionized water (4.2 L) is added. The mixture is charged with phosgene (175 g, 20 g/min). During the addition of phosgene, base (50 wt % NaOH in deionized water) is simultaneously charged to the reactor to maintain the pH of the reaction at 8 to 8.5 during the addition of the initial 90 g of phosgene. Upon addition of about 90 g of phosgene, the rate of base addition is adjusted to maintain a pH of 9.0 to 9.5. Upon completion of addition of the phosgene, the reaction mixture is stirred for appx. 3 min., at which time the pH is reduced to about 8. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 24

A 30 L flask is equipped with an overhead condenser, an overhead stirrer, a pH probe, a caustic solution inlet, and a phosgene inlet, and charged with: (a) resorcinol (572.6 g, 5.20 mol); (b) triethylamine (TEA) (11.2 ml, 0.08 mol); (c) methylene chloride (3.3 L); and (d) de-ionized water (380 ml). Then a solution of 812 g of (isophthaloyl and terephthaloyl chloride, in a 1:1 molar ratio) in 1,218 g of methylene chloride is added to the mixture at 67.7 g/min. Concurrently, 563 g of 50% aqueous sodium hydroxide is added at 18.8 g/min. After the addition is complete approximately 76 g of 50% aqueous sodium hydroxide is slowly added until a pH of 8.0 to 8.5 is achieved. After stirring for 5 min, 79 g of functionalized macromer of formula (57) (in this case the macromer is prepared with sec-butyl acrylate instead of n-butyl acrylate, $M_w$=appx. 5,000 g/mol) is added to the polyester oligomer along with 4,4-bis-(hydroxyphenyl)-2,2-propane (BPA) (1369.74 g, 6.00 mol), p-cumylphenol (83.22 g, 0.392 mol), triethylamine (TEA) (9 g, 0.09 mol), methylene chloride (6.5 L); and de-ionized water (7.0 L). The mixture is charged with phosgene (1,000 g, 20 g/min). During the addition of phosgene, base (50 wt % NaOH in deionized water) is simultaneously charged to the reactor to maintain the pH of the reaction at 8.0 to 8.5 during the addition of the initial 350 g of phosgene. Upon addition of about 500 g of phosgene, the rate of base addition is adjusted to maintain a pH of 9.0 to 9.5. Upon completion of addition of the phosgene, the reaction mixture is stirred for appx. 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 25

A 30 L flask is equipped with an overhead condenser, an overhead stirrer, a pH probe, a caustic solution inlet, and a phosgene inlet, and charged with: (a) resorcinol (572.6 g, 5.20 mol); (b) triethylamine (TEA) (11.2 ml, 0.08 mol); (c) methylene chloride (3.3 L); and (d) de-ionized water (380 ml). Then a solution of 812 g of (isophthaloyl and terephthaloyl chloride, in a 1:1 molar ratio) in 1,218 g of methylene chloride is added to the mixture at 67.7 g/min. Concurrently, 563 g of 50% aqueous sodium hydroxide is added at 18.8 g/min. After the addition is complete approximately 76 g of 50% aqueous sodium hydroxide is slowly added until a pH of 8.0 to 8.5 is achieved. After stirring for 5 min, 79 g of functionalized macromer of formula (57) (in this case the macromer is prepared with butyl acrylate instead of n-butyl acrylate, $M_w$=appx. 60,000 g/mol) is added to the polyester oligomer along with 4,4-bis-(hydroxyphenyl)-2,2-propane (BPA) (1,369.74 g, 6.00 mol), p-cumylphenol (83.22 g, 0.392 mol), triethylamine (TEA) (9 g, 0.09 mol), methylene chloride (6.5 L); and de-ionized water (7.0 L). The mixture is charged with phosgene (1,000 g, 20 g/min). During the addition of phosgene, base (50 wt % NaOH in deionized water) is simultaneously charged to the reactor to maintain the pH of the reaction at 8.0 to 8.5 during the addition of the initial 350 g of phosgene. Upon addition of about 500 g of phosgene, the rate of base addition is adjusted to maintain a pH of 9.0 to 9.5. Upon completion of addition of the phosgene, the reaction mixture is stirred for appx. 3 min. The polymer solution is then separated from the brine layer and washed 2 times with dilute HCl and three times with dionized water. The polymer is isolated by steam precipitation, and is dried in a fluidized bed dryer using hot nitrogen gas.

EXAMPLE 26

The polyacrylate-polycarbonate copolymer from Example 24 is dry blended with 0.3 parts per 100 parts (parts per hundred (phr) of polyacrylate-polycarbonate copolymer) of Tinuvin® 234, 0.3 phr of pentaerythritol tetrastearate, 0.03 phr of SANDOSTAB® P-EPQ phosphite stabilizer, 0.05 phr of carbon black colorant, 0.36 phr of C.I. Solvent Green 3 colorant, 0.08 phr of C.I. Solvent Red 135 colorant, and 0.4 phr of Solvent Yellow 93. The formulation is then extruded on a 30 mm twin-screw extruder at about 288° C. barrel temperature, a screw speed of 450 rpm, and with vacuum venting. Upon drying for 4 h at 121° C., the pellets are injection molded into 3.2 mm±0.12 mm flat chips using a barrel temperature of 288° C. and a mold temperature of 82° C. The chips thus formed are substantially free of aesthetic imperfections at the gate area even at higher injection rates. The chips are then weathered under the ASTM G155-04a accelerated weathering protocol. After about 1,440 h of exposure, the chips have a gloss level of 90 to 105 as measured at an angle of 60 degrees.

EXAMPLE 27

The polyacrylate-polycarbonate copolymer from Example 24 is dry blended with 0.3 phr of Tinuvin® 234, 0.3 phr of pentaerythritol tetrastearate and 0.03 phr of SANDOSTAB® P-EPQ phosphite stabilizer. The formulation is then extruded on a 30 mm twin-screw extruder at about 288° C. barrel temperature, a screw speed of 450 rpm, and with vacuum venting. Upon drying for 4 h at 121° C., the pellets are injection molded into 3.2 mm±0.12 mm flat chips using a barrel temperature of 288° C. and a mold temperature of 82° C. The chips thus formed are substantially free of aesthetic imperfections and have haze values of less than 5%.

EXAMPLE 28

The polyacrylate-polycarbonate copolymer from Example 5 is dry blended with 0.3 phr of Tinuvin® 234, 0.3 phr of pentaerythritol tetrastearate, 0.03 phr of SANDOSTAB® P-EPQ phosphite stabilizer, 0.05 phr of carbon black colorant, 0.36 phr of C.I. Solvent Green 3 colorant, 0.08 phr of C.I. Solvent Red 135 colorant, and 0.4 phr of Solvent yellow 93. The formulation is then extruded on a 30 mm twin-screw extruder at about 288° C. barrel temperature, operating at a screw speed of 450 rpm with vacuum venting. Upon drying for 4 h at 121° C., the pellets are injection molded into 3.2 mm±0.12 mm flat chips using a barrel temperature of 288° C. and a mold temperature of 82° C. The chips have haze values of greater than 10%. The chips are then weathered under the ASTM G155-04a accelerated weathering protocol. After about 1,440 h of exposure, the chips have a gloss level of 70 to 85 as measured at an angle of 60 degrees.

EXAMPLE 29

The polyacrylate-polycarbonate copolymer from Example 5 is dry blended with 0.3 phr of Tinuvin® 234, 0.3 phr of pentaerythritol tetrastearate and 0.03 phr of SANDOSTAB® P-EPQ phosphite stabilizer. The formulation is then extruded on a 30 mm twin-screw extruder at about 288° C. barrel temperature, operating at a screw speed of 450 rpm with vacuum venting. Upon drying for 4 h at 121° C., the pellets are injection molded into 3.2 mm±0.12 mm flat chips using a barrel temperature of 288° C. and a mold temperature of 82° C. The chips have haze values of greater than 10%.

Compounds are described herein using standard nomenclature. A dash ("-") that is not between two letters or symbols is used to indicate a point of attachment for a substituent. For example, —CHO is attached through the carbon of the carbonyl (C=O) group. The singular forms "a," "an," and "the"

include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The notation "±0.12 mm" means that the indicated measurement can be from an amount that is 0.12 mm lower to an amount that is 0.12 mm higher than the stated value.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A polyacrylate-polycarbonate copolymer comprising:
a polycarbonate block comprising aromatic carbonate units, and
a polyacrylate block derived from a difunctional polyacrylate polymer having the formula $Z^1\text{-}(M)_x\text{-}Z^2$ wherein M is an acrylate block unit comprising a reaction residue of a (meth)acrylate monomer, a non-(meth)acrylate monomer, or a combination comprising a (meth) acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $\text{-}(A^3)_y\text{-}B$, wherein B is a reactive end group comprising a hydroxy group or non-hydroxy group, $A^3$ is an aliphatic linking group, an aromatic linking group, or an aliphatic-aromatic linking group, and y is 0 or 1, and
wherein $A^3$ is free of hydrogen atoms located on a carbon atom in a position beta to B when B is a hydroxy group, and B and $A^3$ are each free of sulfur atoms;
wherein the polyacrylate block has a $T_g$ of less than or equal to −25° C.; and wherein the number and type of acrylate block units of the polyacrylate block, and the weight ratio of polyacrylate blocks and polycarbonate blocks of the polyacrylate-polycarbonate copolymer are selected such that a molded article consisting of the polyacrylate-polycarbonate copolymer having a thickness of 3.2±0.12 millimeters has a haze of less than or equal to 5% as determined according to ASTM D1003-00.

2. The polyacrylate-polycarbonate copolymer of claim 1, wherein the acrylate block units are present in an amount of 1 to 30 weight percent of the total weight of the polyacrylate-polycarbonate copolymer.

3. The polyacrylate-polycarbonate copolymer of claim 1 wherein the acrylate block units comprise the reaction residue of an acrylate monomer, methacrylate monomer, unsaturated vinyl compounds, unsaturated olefinic compounds, styrenic compounds, or a combination comprising at least one of the foregoing.

4. The polyacrylate-polycarbonate copolymer of claim 1 wherein the polyacrylate block has a $T_g$ of less than or equal to −30° C.

5. The polyacrylate-polycarbonate copolymer of claim 1 wherein x represents a degree of polymerization of 5 to 1,000.

6. The polyacrylate-polycarbonate copolymer of claim 1 wherein the polyacrylate polymer has end groups that can react to form a bond with acid groups, carbonate groups, acid chloride groups, chloroformate groups, phosgene, or hydroxy groups.

7. The polyacrylate-polycarbonate copolymer of claim 6, wherein the polyacrylate polymer or oligomer has end groups comprising hydroxy, phenolic hydroxy, carboxylic acid, carboxylate salts, aliphatic carboxylate ester, aromatic carboxylate ester, carboxylic anhydride, carboxylic acid chloride, chloroformate, aryl carbonate, aliphatic amine, aromatic amine, imide, or imide salt.

8. The polyacrylate-polycarbonate copolymer of claim 6, wherein the polyacrylate polymer has a polydispersity of less than or equal to 2.

9. The polyacrylate-polycarbonate copolymer of claim 1, wherein the polyacrylate block is a difunctional end group functionalized polyacrylate block prepared using reversible addition-fragmentation chain transfer polymerization, nitroxide-mediated polymerization, or atom transfer radical polymerization.

10. The polyacrylate-polycarbonate copolymer of claim 9 wherein the polyacrylate block is derived from a difunctional, end group functionalized polyacrylate polymer prepared using nitroxide-mediated polymerization.

11. The polyacrylate-polycarbonate copolymer of claim 10, wherein the number and type of acrylate block units of the polyacrylate block, and the weight ratio of polyacrylate blocks and polycarbonate blocks of the polyacrylate-polycarbonate copolymer are selected such that a molded article consisting of the polyacrylate-polycarbonate copolymer having a thickness of 3.2±0.12 millimeters has a haze of less than or equal to 2% as determined according to ASTM D1003-00.

12. The polyacrylate-polycarbonate copolymer of claim 1 wherein the polycarbonate block further comprises aromatic ester units.

13. The polyacrylate-polycarbonate copolymer of claim 1 wherein a molded color chip having a thickness of 3.2±0.12 mm and consisting of the polyacrylate-polycarbonate and less than or equal to 5 wt % additive has, after weathering according to ASTM G155-04a and when measured according to ASTM D2457-03 at an angle of 60 degrees (°) and calibrated using a black glass standard of 100 GU, a surface gloss loss of less than or equal to 20% when compared to a comparable molded color chip consisting of an otherwise compositionally identical polycarbonate but without a polyacrylate block, and identical types and amounts of any additive used.

14. The polyacrylate-polycarbonate copolymer of claim 1 wherein a molded article having a thickness of 3.2±0.12 mm and consisting of the polyacrylate-polycarbonate has, when measured for Notched Izod Impact (NII) strength according to the method of ASTM D1238-04, a reduction in the ductile-to-brittle transition point temperature of greater than or equal to 10° C., when compared to an otherwise compositionally identical polycarbonate but without a polyacrylate block.

15. A polyacrylate-polycarbonate copolymer consisting essentially of:
a polycarbonate block consisting essentially of aromatic carbonate units, or a combination of arylate ester units and aromatic carbonate units, and
a polyacrylate block derived from a difunctional polyacrylate polymer having the formula $Z^1\text{-}(M)_x\text{-}Z^2$ wherein M is an acrylate block unit consisting essentially of a reaction residue of a (meth)acrylate monomer, a non-(meth)acrylate monomer, or a combination of a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $-(A^3)_y-B$, wherein B is a hydroxy group or non-hydroxy group, $A^3$ an aliphatic linking group, an aromatic linking group, or an aliphatic-aromatic linking group, and y is 0 or 1, wherein $A^3$ is free of hydrogens located on a carbon atom in a position beta to B when B is a hydroxy group, and wherein B and $A^3$ are each free of sulfur atoms;

wherein the polyacrylate block has a $T_g$ of less than or equal to −25° C.; and wherein the number and type of acrylate block units of the polyacrylate block, and the weight ratio of polyacrylate blocks and polycarbonate blocks of the polyacrylate-polycarbonate copolymer are selected such that a molded article consisting of the polyacrylate-polycarbonate copolymer having a thickness of 3.2±0.12 millimeters has a haze of less than or equal to 5% as determined according to ASTM D1003-00.

16. A polyacrylate-polycarbonate copolymer, comprising the reaction product of:

a difunctional polyacrylate polymer having the formula $Z^1-(M)_x-Z^2$ wherein M is an acrylate block unit comprising a reaction residue of a (meth)acrylate monomer, a non-(meth)acrylate monomer, or a combination comprising a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $-(A^3)_y-B$, wherein B is a reactive end group comprising a hydroxy group or non-hydroxy group, $A^3$ is an aliphatic linking group, an aromatic linking group, or an aliphatic-aromatic linking group, and y is 0 or 1, and wherein $A^3$ is free of hydrogen atoms located on a carbon atom in a position beta to B when B is a hydroxy group, and B and $A^3$ are each free of sulfur atoms;

a dihydroxy aromatic compound, or a combination of a dihydroxy aromatic compound and a dicarboxylic acid derivative;

phosgene; and a chain stopper.

17. A thermoplastic composition comprising a blend of:

a first polymer comprising a polyacrylate-polycarbonate copolymer comprising a polycarbonate block comprising aromatic carbonate units, and a polyacrylate block derived from a difunctional polyacrylate polymer having the formula $Z^1-(M)_x-Z^2$ wherein M is an acrylate block unit comprising a reaction residue of a (meth)acrylate monomer, a non-(meth)acrylate monomer, or a combination comprising a (meth)acrylate and a non-(meth)acrylate monomer, and wherein at least one acrylate block unit is a reaction residue of a (meth)acrylate monomer; x is greater than one; and $Z^1$ and $Z^2$ are each independently functionalized terminal groups of the formula $-(A^3)_y-B$, wherein B is a reactive end group comprising a hydroxy group or non-hydroxy group, $A^3$ is an aliphatic linking group, an aromatic linking group, or an aliphatic-aromatic linking group, and y is 0 or 1, wherein $A^3$ is free of hydrogen atoms located on a carbon atom in a position beta to B when B is a hydroxy group, and B and $A^3$ are each free of sulfur atoms;

wherein the polyacrylate block has a $T_g$ of less than or equal to −25° C.; and wherein the number and type of acrylate block units of the polyacrylate block, and the weight ratio of polyacrylate blocks and polycarbonate blocks of the polyacrylate-polycarbonate copolymer are selected such that a molded article consisting of the polyacrylate-polycarbonate copolymer having a thickness of 3.2±0.12 millimeters has a haze of less than or equal to 5% as determined according to ASTM D1003-00; and a second polymer comprising a polycarbonate polymer, wherein the first and second polymers are not identical, and wherein the polyacrylate block is derived from a difunctional, end group functionalized polyacrylate polymer prepared using reversible addition-fragmentation chain transfer polymerization, nitroxide-mediated polymerization, or atom transfer radical polymerization.

18. The thermoplastic composition of claim 17, wherein the second polymer comprises a polycarbonate, a polyester-polycarbonate, a polyester, a polysiloxane-polycarbonate, or a combination comprising at least one of the foregoing additional resins.

19. An article comprising the polyacrylate-polycarbonate copolymer of claim 1.

20. The polyacrylate-polycarbonate copolymer of claim 1, wherein the number and type of acrylate block units of the polyacrylate block, and the weight ratio of polyacrylate blocks and polycarbonate blocks of the polyacrylate-polycarbonate copolymer are selected such that a molded article consisting of the polyacrylate-polycarbonate copolymer having a thickness of 3.2±0.12 millimeters has a haze of less than or equal to 2% as determined according to ASTM D1003-00.

* * * * *